United States Patent [19]

Mangini

[11] Patent Number: 4,759,049
[45] Date of Patent: Jul. 19, 1988

[54] TRUNK IDENTIFICATION SYSTEM

[75] Inventor: Richard J. Mangini, Brookfield, Conn.

[73] Assignee: Network Control Corporation, Danbury, Conn.

[21] Appl. No.: 935,245

[22] Filed: Nov. 26, 1986

[51] Int. Cl.⁴ .............................................. H04M 3/30
[52] U.S. Cl. ........................................ 379/22; 379/25
[58] Field of Search .................. 379/22, 25, 246, 247, 379/249, 26, 29, 248

[56] References Cited

U.S. PATENT DOCUMENTS 3,898,396  8/1975  Gushue et al. ...................... 379/25
3,943,298  3/1976  Clark et al. ....................... 379/248
4,286,118  8/1981  Mehaffey et al. ................... 379/247
4,403,119  9/1983  Conklin et al. ..................... 379/5
4,467,148  8/1984  Stafford et al. ..................... 379/5

Primary Examiner—Stafford D. Schreyer
Attorney, Agent, or Firm—Mattern, Ware, Stoltz & Fressola

[57] ABSTRACT

An improved trunk identification system for identifying an inbound trunk line selected by a telephone company routing system upon completion of a test routine by associated test equipment. The improved trunk identification system provides for multiplexed use of dual-tone multi-frequency receivers and decoders so as to ensure reliable and economical detection of a specified DTMF tone used to signal the completion of a test routine.

12 Claims, 19 Drawing Sheets

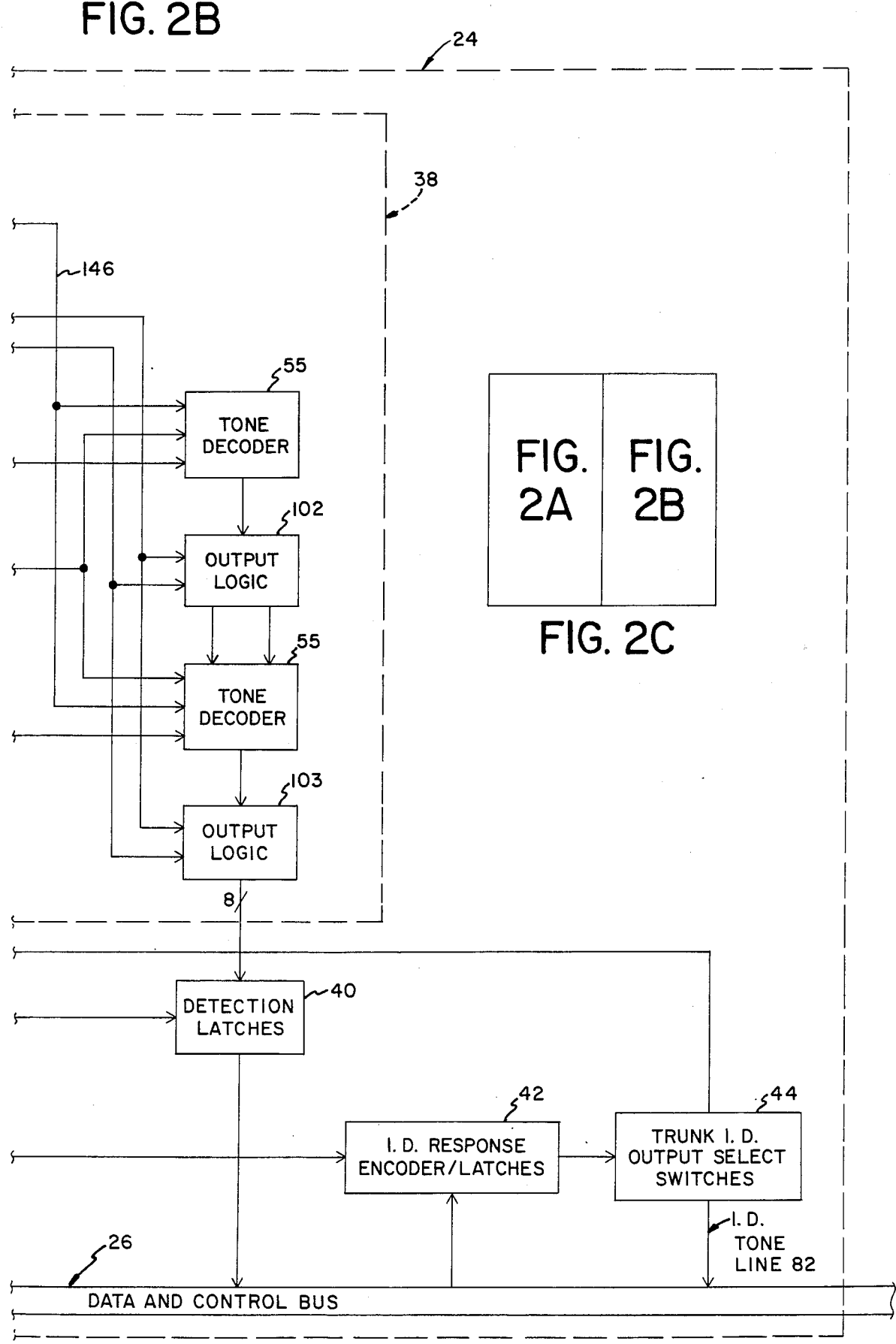

| FIG. 3A | FIG. 3B |
|---------|---------|
|         | FIG. 3C |

FIG. 3D

| FIG. 4A | FIG. 4B | FIG. 4C |
|---------|---------|---------|

FIG. 4D

| FIG. 5A | FIG. 5B | FIG. 5C | FIG. 5D |
|---------|---------|---------|---------|
| FIG. 5E | FIG. 5F | FIG. 5G | FIG. 5H |

FIG. 5I

TRUNK IDENTIFICATION SYSTEM

TECHNICAL FIELD

The present invention relates to telephone line test equipment and specifically to the identification of inbound telephone trunk lines. The present invention can identify telephone trunk lines including direct inward dial wide area exchange lines (INWATS lines) as well as other direct inward dial (DID) lines commonly used by commercial establishments. The present invention is normally used in association with telephone line test equipment, thereby providing a means for identifying inbound trunk lines which have been tested and which the user performing such tests has no specific way of selecting on an individual basis.

BACKGROUND ART

Telephone line test equipment for use by telephone subscribers, as distinguished from telephone company (TELCO) test equipment, is a relatively new field in the communication art. U.S. Pat. No. 4,467,148, Stafford et al., assigned to the present assignee, discloses this new genre of test equipment and specifically discloses the ability to test telephone tie or trunk lines with the use of a trunk selectable private branch exchange (PBX). The telephone line analyzer disclosed in the '148 patent although capable of testing an inward dial WATS line as well as other DID lines, would be unable to identify such lines if a plurality of such lines are present at one user location.

Typically, large corporations, reservation centers, order entry centers, and others that need many inbound trunks for its customers or employees rent a plurality of inbound trunk lines all of which are usually associated with a single telephone number. Thus for a reservation system, a single 800 number would typically be listed for access to the reservation system. Depending upon the number of anticipated callers at any given time, a plurality of inward dial WATS lines (INWATS) are leased from the appropriate telephone company. The customer, when calling the 800 number, is routed to one of these inbound trunks by the telephone company routing system. One such routing system is known as a rotary hunt wherein the telephone company routes inward dialed calls in a circular pattern. For instance, if the subscriber has 20 INWATS lines, the first call would be routed to INWATS line #1, the next call to INWATS line #2, etc., up to INWATS line #20, for the twentieth caller, and back to INWATS line #1 for the twenty-first caller, etc.

In a "most available first" hunt routine, the telephone company routes inward dialed calls to the lines on a prioritized basis based upon the least used lines with respect to the calls received on the previous day. Thus, for instance, if the subscriber again has 20 INWATS lines, and if on day 1 line #3 was the most heavily used, line #7 the next heaviest used, etc., while lines #5 and #10 were the next to the least and the least used, with the remaining lines being somewhere in between these extremes, the inward dialed calls would be routed on a sequential basis to line #10, then line #5, etc. Line #7 and line #3 would be selected for the nineteenth and twentieth calls respectively while line #10 would be selected for the twenty-first call. This prioritization is then repeated for the following day based upon the usage of the lines for the present day. This routing routine is similar to the circular hunt routine in that a set sequence of lines is used on any given day.

In a third type of routing routine the telephone company routes calls in what is known as a top down rotary sequence. In this routine, a selected sequence for the subscriber's lines is chosen; such as line #1, line #2, . . . line #20 (for a twenty inbound trunk example), back to line #1, etc. However, if for example the last call was placed on line #5 and before the next incoming call line #2 has become available (the calling party on line #2 has "hung up"), then line #2 and not line #6 is selected for the next call.

For the "circular" hunt and "least used first" hunt routines the trunk identification system "knows" that each inbound trunk will be accessed by the telephone company routing routine although the actual line to be selected for any given call is not known by the trunk identification system. Therefore in the example where the subscriber has leased twenty inbound trunks, a test program conducted during off-hours (such as in the early morning when the lines are not otherwise being used) will access each inbound trunk without the need for "busying out" the trunks which have been tested.

In the "top down rotary" hunt routine the first trunk in the sequence would be repetitively accessed by the routing system if that line was not kept in an "off hook" condition ("busy out") after being tested. Thus the trunk identification system not only must identify such a tested inbound trunk, but must also maintain it in an "off-hook" state by "busying" it out after the test routine. This "busy out" is performed on each tested trunk until all trunks have been tested.

The only prior art trunk identification unit known is that of the present assignee and is identified as the JANUS TM Trunk Identification Unit. This prior art device, however, uses analog phase lock loop circuitry for the detection of a particular DTMF tone and does not use or suggest any multiplexing capability for the phase lock loop circuitry resulting in separate phase lock loop detection circuits installed for each inbound trunk to be tested. This analog trunk identification unit has been found to be subject to drift as a result of ambient temperature variations as well as due to aging of circuit components. As a result, the trunk identification unit can potentially falsely interpret the presence of the unique DTMF tone (normally the "D" DTMF tone) and then transmit its identification information regarding this particular trunk line even though the inbound trunk is not connected to test equipment at that time. Similarly, due to the same inaccuracies associated with the analog DTMF detection circuitry, the actual presence of a "D" tone can be misinterpreted, thereby resulting in the trunk identification system failing to transmit the identification information, resulting in negation of any value with regard to the test of that INWATS or DID line In contrast, the improved trunk identification system of the present invention employs digital DTMF decoders used in a multiplexed fashion so that eight DID or INWATS lines can be tested by two digital DTMF decoders, receivers. This arrangement results in accurate decoding of the initiating "D" tone when present and not falsely detecting a "D" tone during normal voice communications. Furthermore, due to the fact that the DTMF digital receivers are crystal controlled, drift associated with changes in ambient temperature or aging of components is essentially eliminated.

SUMMARY OF THE INVENTION

An improved trunk identification system is disclosed for use with telephone line test equipment and specifically for identifying inward dialed wide area exchange telephone lines (INWATS) as well as other direct inward dialed lines (DID lines) commonly used in commercial applications. The testing of such lines (generally referred to as inbound trunks) has traditionally posed a problem since the selection of any particular line is not controllable by the caller or subscriber but is rather determined by a trunk hunt-routine used by the telephone company central office to which such lines are connected.

The present invention is used in association with a tone control and measurement system located at the incoming (far) end of the inbound trunks. The tone control and measurement system measures the test results of incoming tests associated with a near-end test set (near end test control system) such as the JANUS IIe TM test system manufactured by the present assignee, Network Control Corporation of Danbury, Conn. The tone control and measurement system also transmits test signals and test results back to the near end control system. In this way, both the incoming and outgoing wire pairs associated with an inbound trunk are tested by the near end control system and the far end tone control and measurement system.

In actual operation, the tone control and measurement system after completion of its test routine with the near-end control system, generates a unique DTMF tone normally not generated by an ordinary telephone handset, and in particular generates the "D" DTMF tone normally used only for special telephone tests or maintenance purposes. This "D" tone is transmitted onto the inbound trunk. The trunk identification system constantly scans all of the inbound trunks to determine if any such trunk has this "D" tone present and if the tone is detected, the trunk identification system, through stored information concerning each inbound trunk, transmits a unique address (four digit number) for the inbound trunk selected by the telephone company hunt routine so that the near end control system can ascertain the actual inbound trunk which was tested.

Furthermore, depending upon the type of telephone hunt system used at the local telephone company central office, the trunk identification system can maintain the tested trunk in an "Off Hook" condition if necessary, thereby preventing that trunk from being reaccessed by the near end test control system so as to ensure that each inbound trunk is tested.

The need for terminating such trunks so as to maintain them in an "Off Hook" condition is a result of a particular hunt routine used by many telephone companies wherein the next line to be selected upon receipt of another call is not performed on a strictly sequential basis but rather upon an order which includes the possibility of jumps to previously accessed trunks if such trunks become available (when the previous caller(s) has "hung up"). By maintaining each tested inbound trunk in an "Off Hook" state until all inbound trunks are tested, an efficient method is provided for testing each trunk even when non-sequential hunt routines are employed by the telephone company central office.

The improvements of the trunk identification units in the present invention include the use of digital DTMF receivers and decoders which sequentially test a plurality of inbound trunks in a manner which ensures that each trunk is sampled on a rapid, periodic basis, so that detection of a "D" tone, indicative of completion of a test routine for an inbound trunk, is guaranteed under all circumstances.

Due to the multiplexing of a plurality of inbound trunks to a single DTMF receiver and decoder, the circuitry employed by the present invention is greatly reduced compared to prior art analog type detection circuitry.

In contrast, the prior art trunk identification system employs an analog phase lock loop DTMF decoding technique which results in separate detection circuitry being used for each inbound trunk to be tested. Such analog circuitry is prone to drift due to ambient temperature changes as well as due to component aging, both of which are essentially eliminated through use of the digital DTMF receiver and decoder technique employed in the present invention.

Therefore, the present invention is able to guarantee accurate detection of the test completion tone (i.e., the DTMF "D" tone), resulting in accurate identification of the tested inbound trunk to the near-end test control system. The end result is an overall test system which can identify and test inward dialed lines which otherwise are not testable and simultaneously identifiable.

It is therefore a principal object of the present invention to provide an improved trunk identification system employing digital, dual-tone, multi-frequency (DTMF) receivers and decoders to eliminate false detection of a DTMF tone indicative of a test completion with respect to inbound telephone trunks.

A further object of the present invention is to provide an improved trunk identification system of the above description employing multiplexing circuitry in conjunction with controller circuitry so as to allow a single DTMF receiver-decoder to sequentially sample a plurality of inbound trunks so as to ensure the detection of a unique DTMF tone whenever such a tone is placed on an inbound trunk by an associated tone control and measurement system.

A still further object of the present invention is to provide a trunk identification system of the above description wherein the electronic component part count is greatly reduced for the overall trunk identification system as compared to prior art systems using analog DTMF decoders.

Another object of the present invention is to provide an improved trunk identification system of the above description which incorporates the ability to identify up to eight inbound trunks on a single module which can be used in conjunction with earlier trunk identification systems which used analog test circuitry for detecting the DTMF tone.

A further object of the present invention is to provide an improved trunk identification system of the above description which uses gate circuitry for preventing sampling of the detected DTMF tones during logic transitions.

Other objects of the present invention will in part be obvious and will in part appear hereinafter.

BRIEF DESCRIPTION OF THE DRAWINGS

For a fuller understanding of the nature and objects of the invention, reference should be made to the following detailed description taken in conjunction with the following drawings, in which:

FIG. 2, comprising FIGS. 2A and 2B, is a block diagram of the trunk identification system inbound trunk interface module illustrated in FIG. 1, specifically showing its interconnection to the inbound trunks and to the data and control bus.

FIG. 2C is a diagram showing how FIGS. 2A and 2B are put together to form FIG. 2.

FIG. 3, comprising

FIG. 3D is a diagram showing how FIGS. 3A, 3B and 3C are put together to form FIG. 3.

FIG. 4, comprising

FIG. 4D is a diagram showing how FIG. 4A, 4B, and 4C are put together to form FIG. 4.

FIG. 5, comprising

FIG. 5I is a diagram showing how FIGS. 5A-5H are put together to form FIG. 5.

BEST MODE FOR CARRYING OUT THE INVENTION

Figure 1:
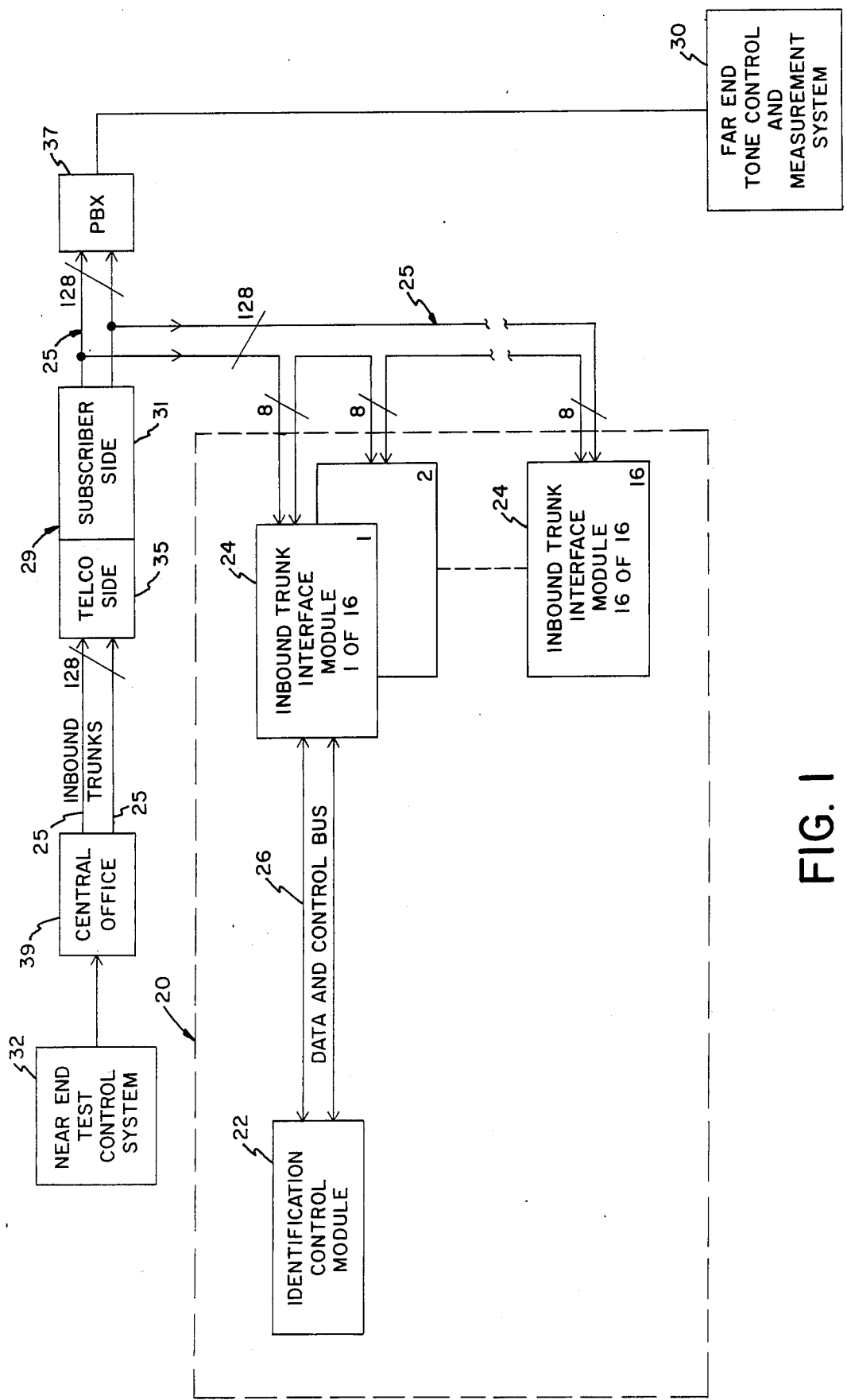
FIG. 1 is an overall block diagram of the trunk identification system according to the present invention illustrating its overall configuration comprising a test control module, up to sixteen inbound trunk interface modules, a data and control bus, as well as showing an external tone control and measurement system and a near end test control system for performing tests on the inbound trunks.

As best seen in FIG. 1, the trunk identification system 20 according to the present invention comprises an identification control module 22 and from 1 to 16 inbound trunk interface modules 24. Each interface module can be connected across up to eight direct inward dial trunks 25, which can be inbound wide area exchange lines (INWATS) or other direct inward dial lines (DID) lines. These inbound lines will be generally referred to herein as inbound trunks As seen in FIG. 1, the interface modules connect to the inbound trunks 25 between the subscriber's side 31 of a telephone company demarcation point 29 and the PBX37. The demarcation point is a device where the telephone company lines are terminated on one side (the telephone side 35) and the subscriber's wiring connects to the lines on the other side (subscriber side 31).

As also seen in FIG. 1, a far end tone control and measurement system 30 is interfaced with any selected inbound trunk by means of private branch exchange (PBX) 37. A typical tone control and measurement system is the JANUS TM STG-16 Tone Responder manufactured by the present assignee.

The inbound trunks emanate frcm the telephone company central office 39 which selects one of the inbound trunks whenever an incoming INWATS or DID call is received. For testing these inbound trunks, the subscriber uses a near end test control system, such as the test control system manufactured by the present assignee known as the JANUS IIe TM Control Console.

Figure 4A:
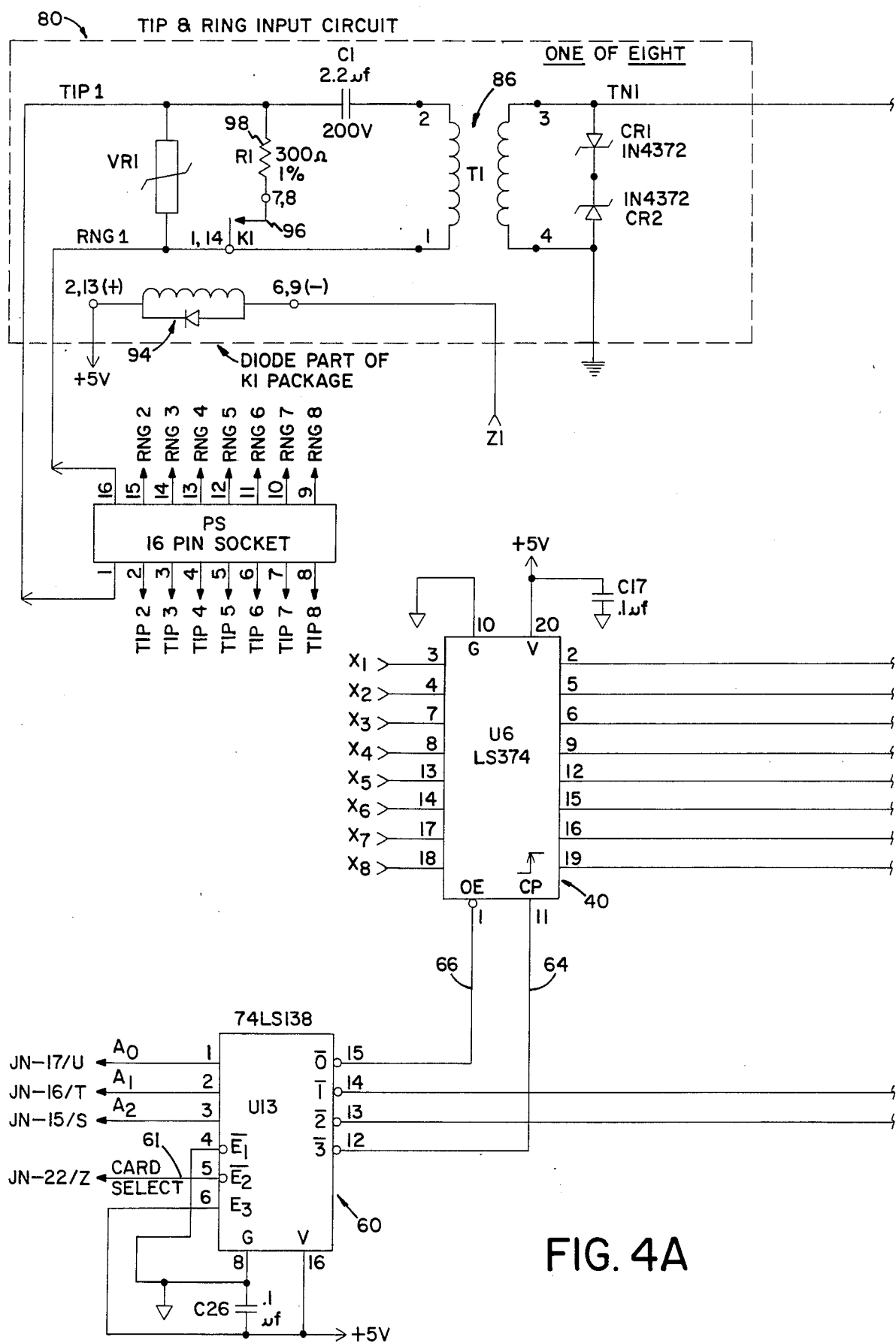
FIGS. 4A, 4B and 4C, is the overall schematic diagram of the remaining portions of the inbound trunk interface module not shown in FIG. 3, showing its interconnection to the inbound trunks and to the decoded DTMF tones corresponding to those generated by the external tone control and measurement system indicating the completion of a test routine so as to then prompt the identification system to identify the inbound trunk tested.
Figure 4B:
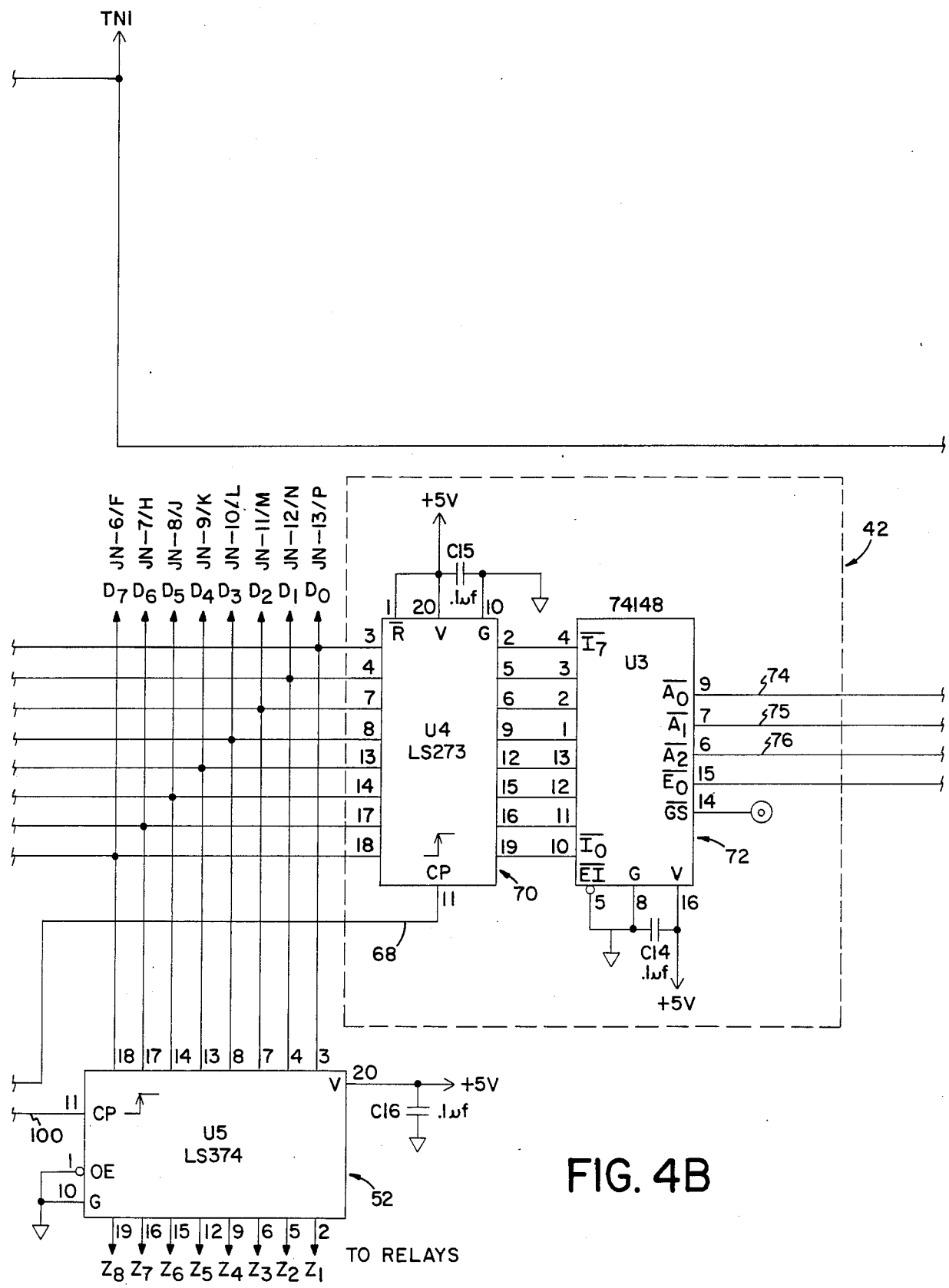
Figure 4C:
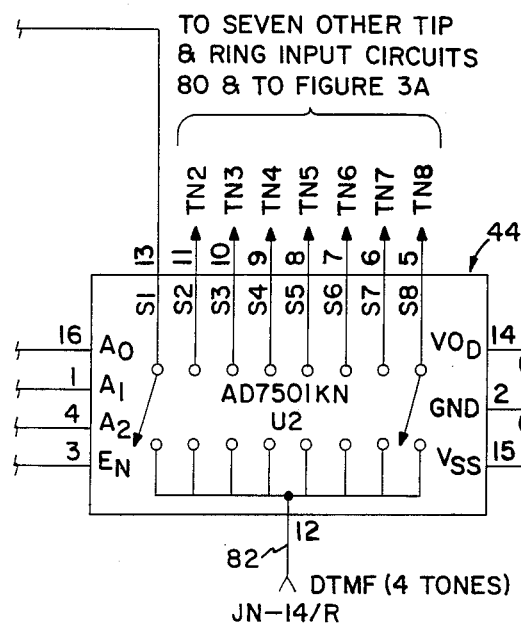
Figure 4C:
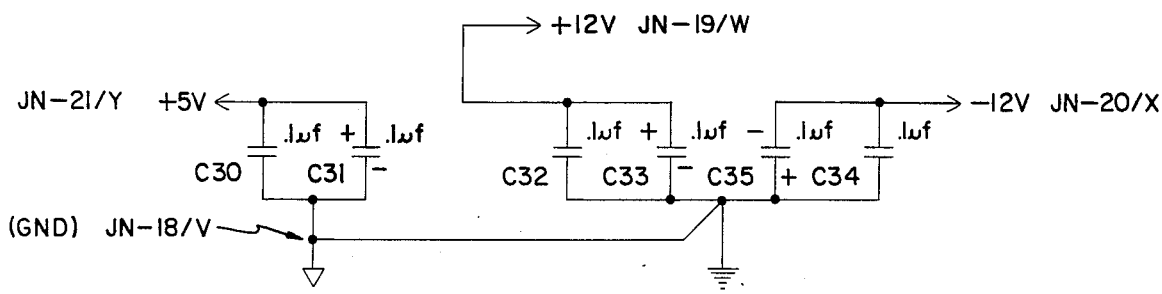
Figure 5A:
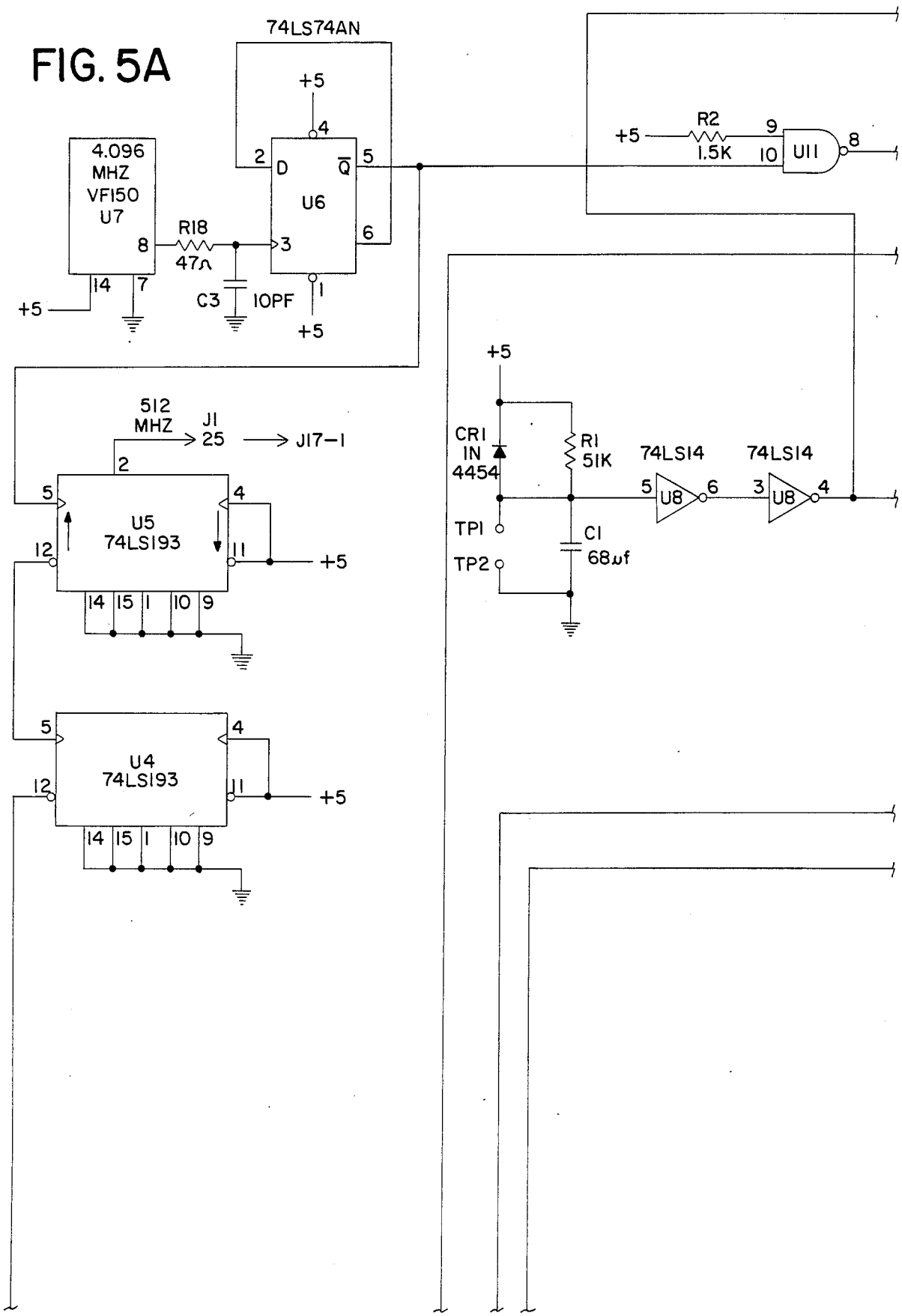
FIGS. 5A-5H is the overall schematic diagram of the identification control module shown in FIG. 1 and forming part of the trunk identification system, the schematic diagram showing how this control module controls the operation of the sixteen inbound trunk interface modules forming the overall trunk identification system.
Figure 5B:
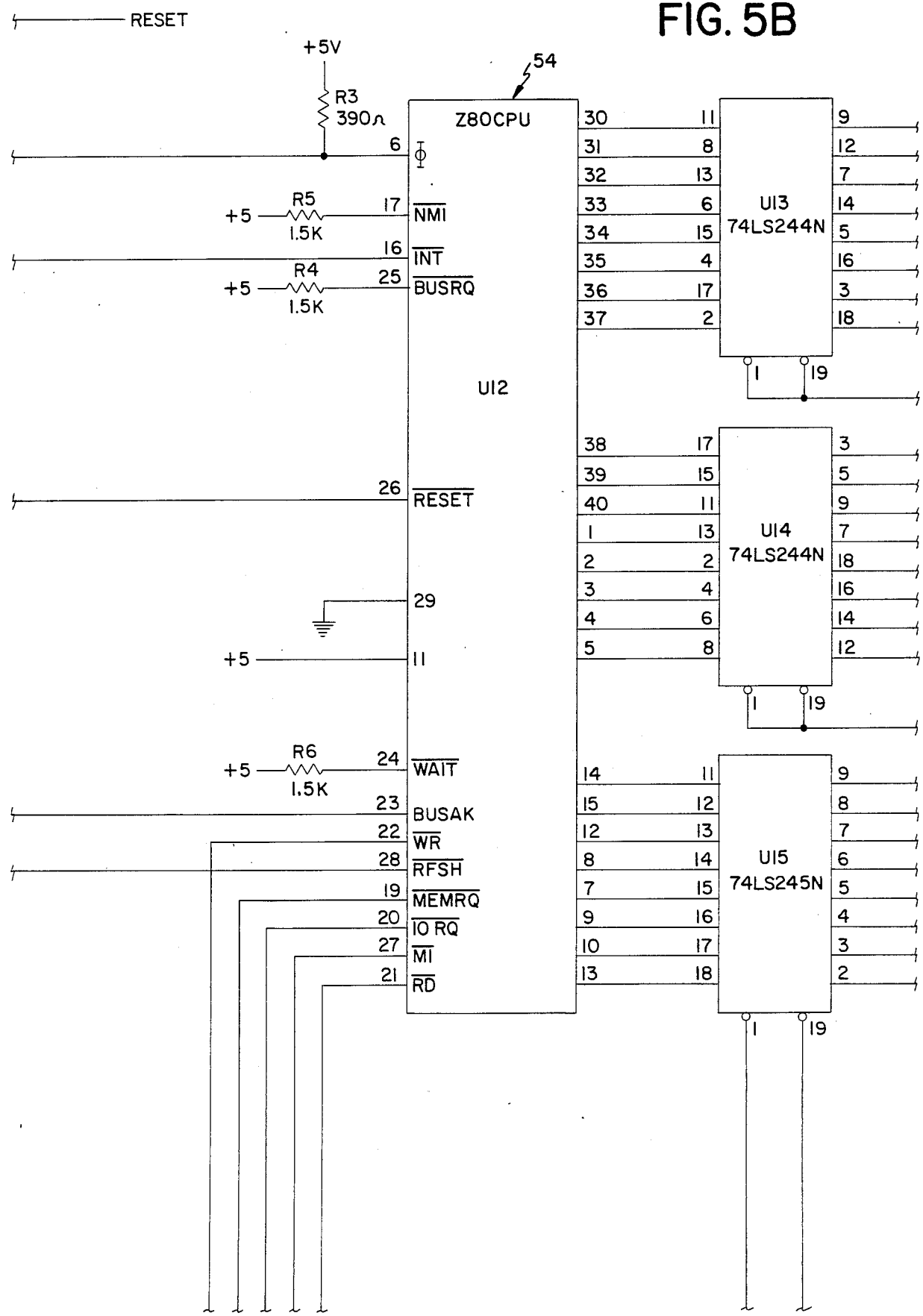
Figure 5C:
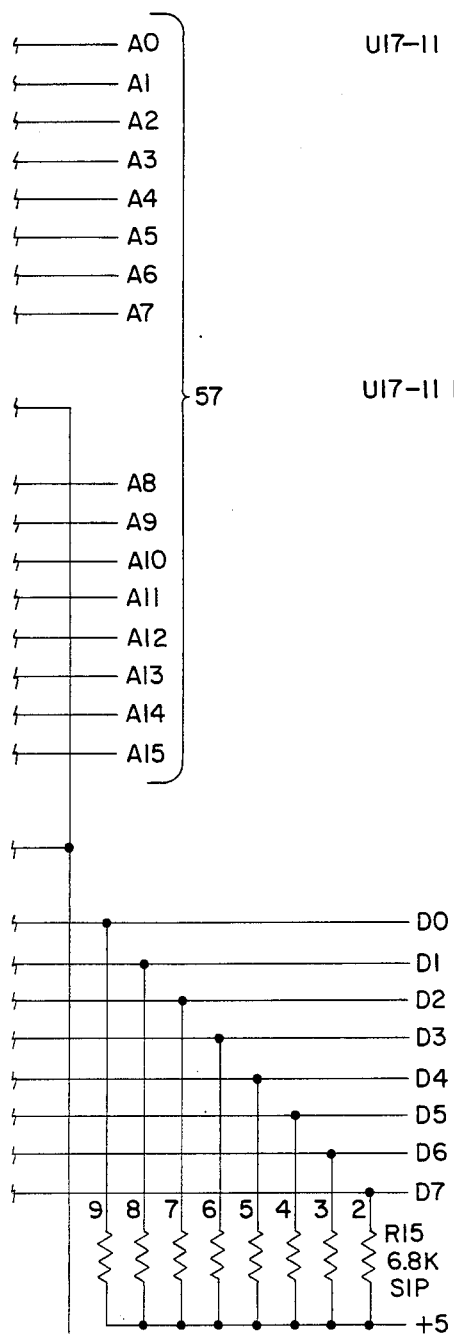
Figure 5C:
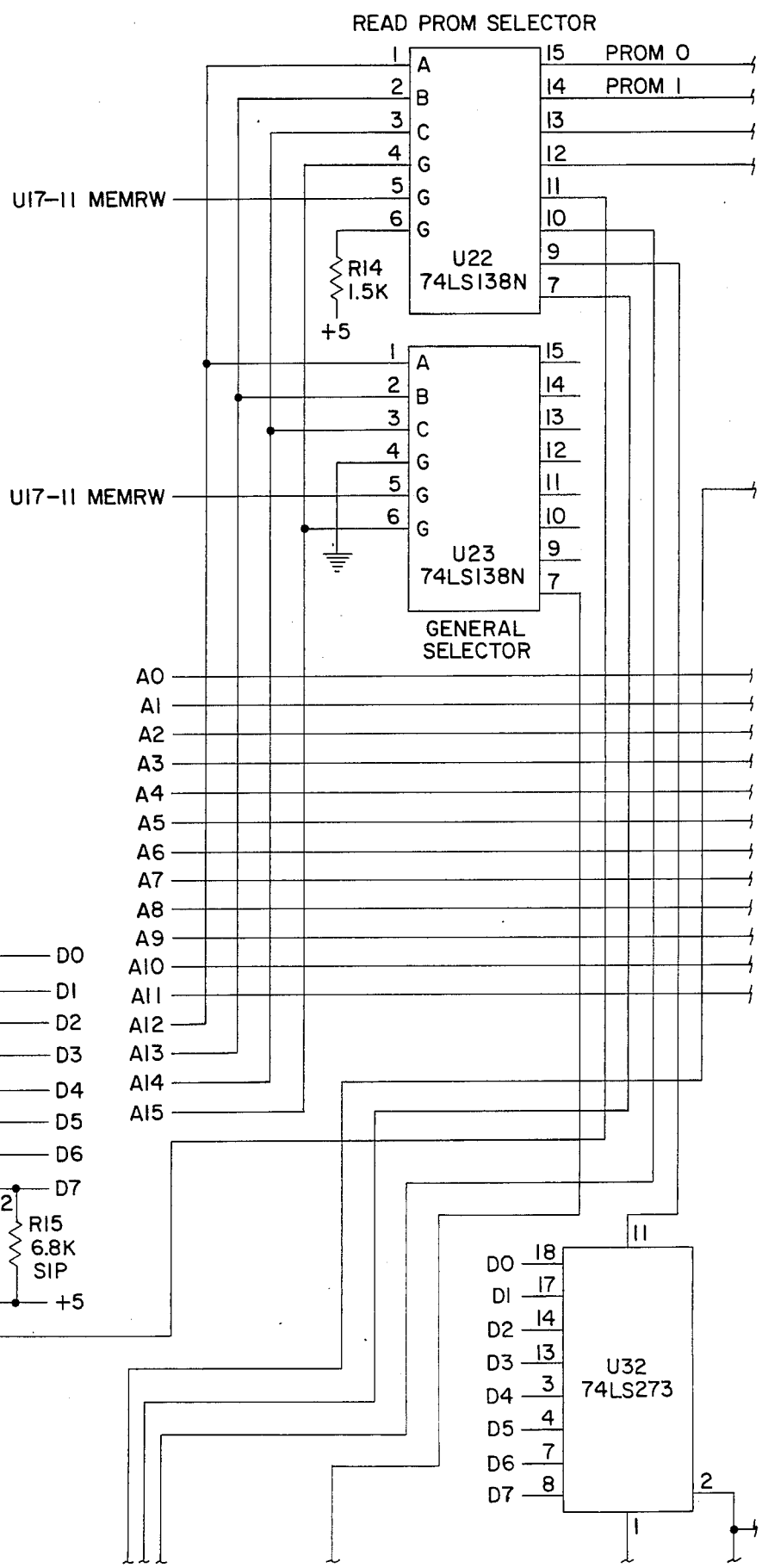
Figure 5D:
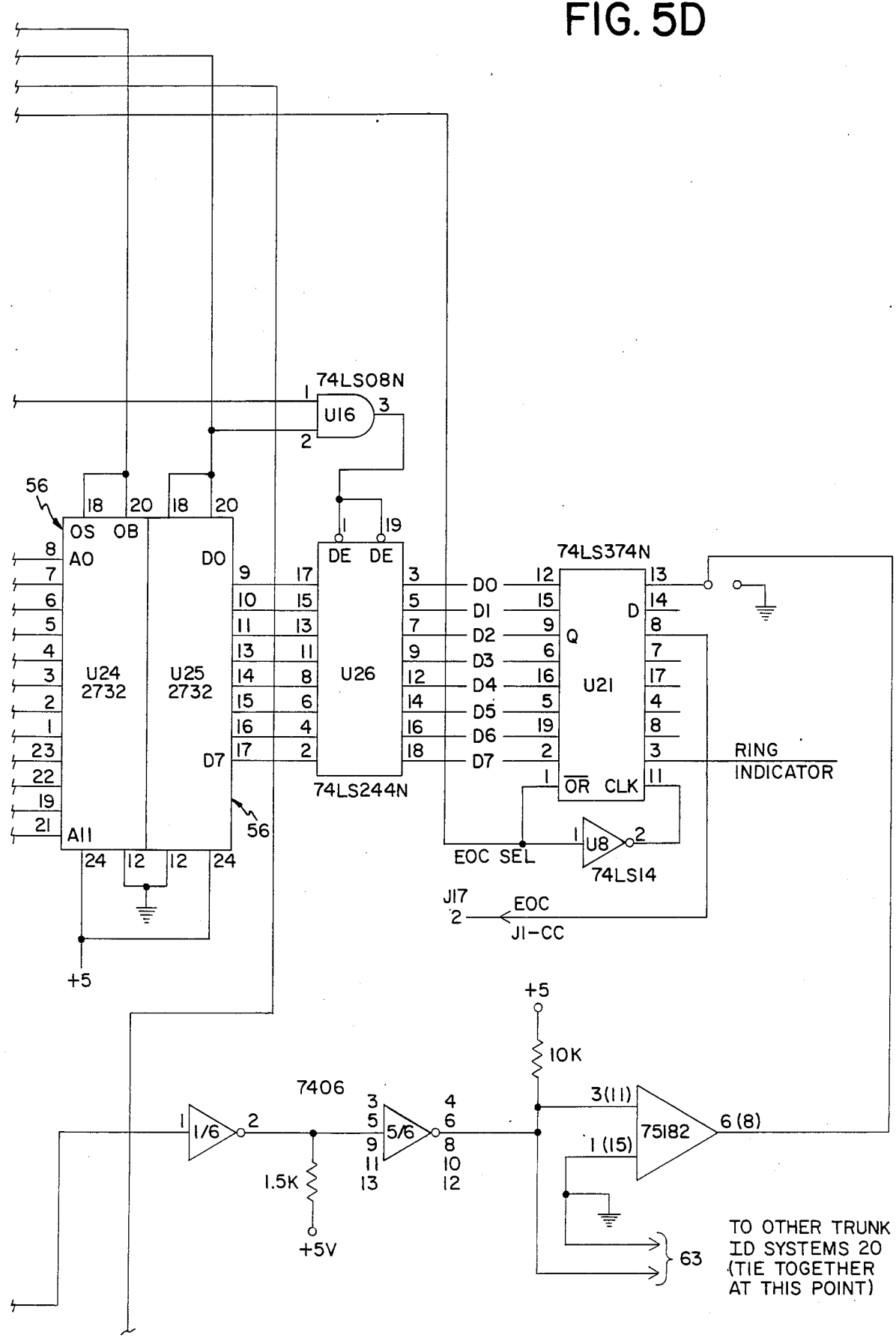
Figure 5E:
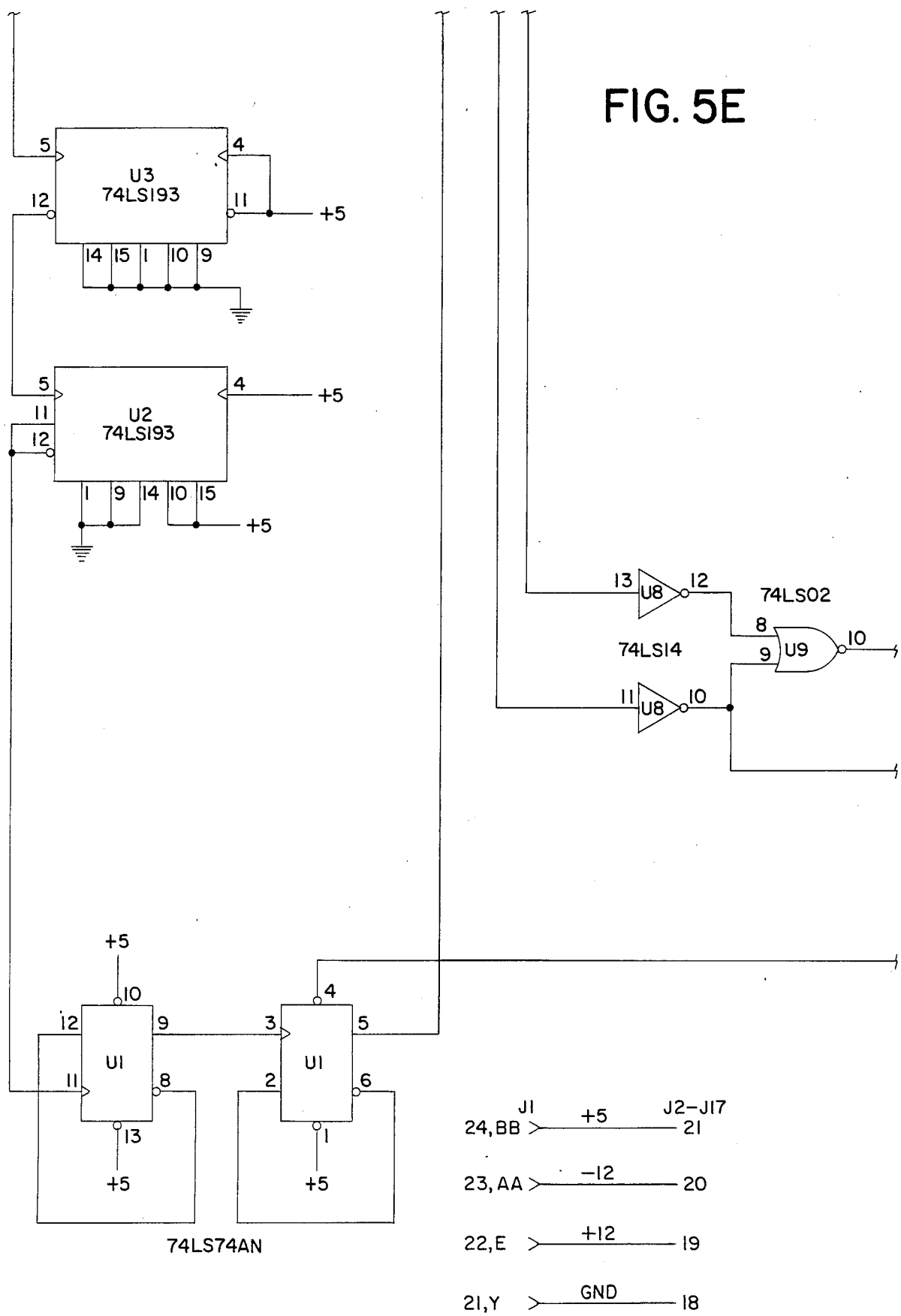
Figure 5F:
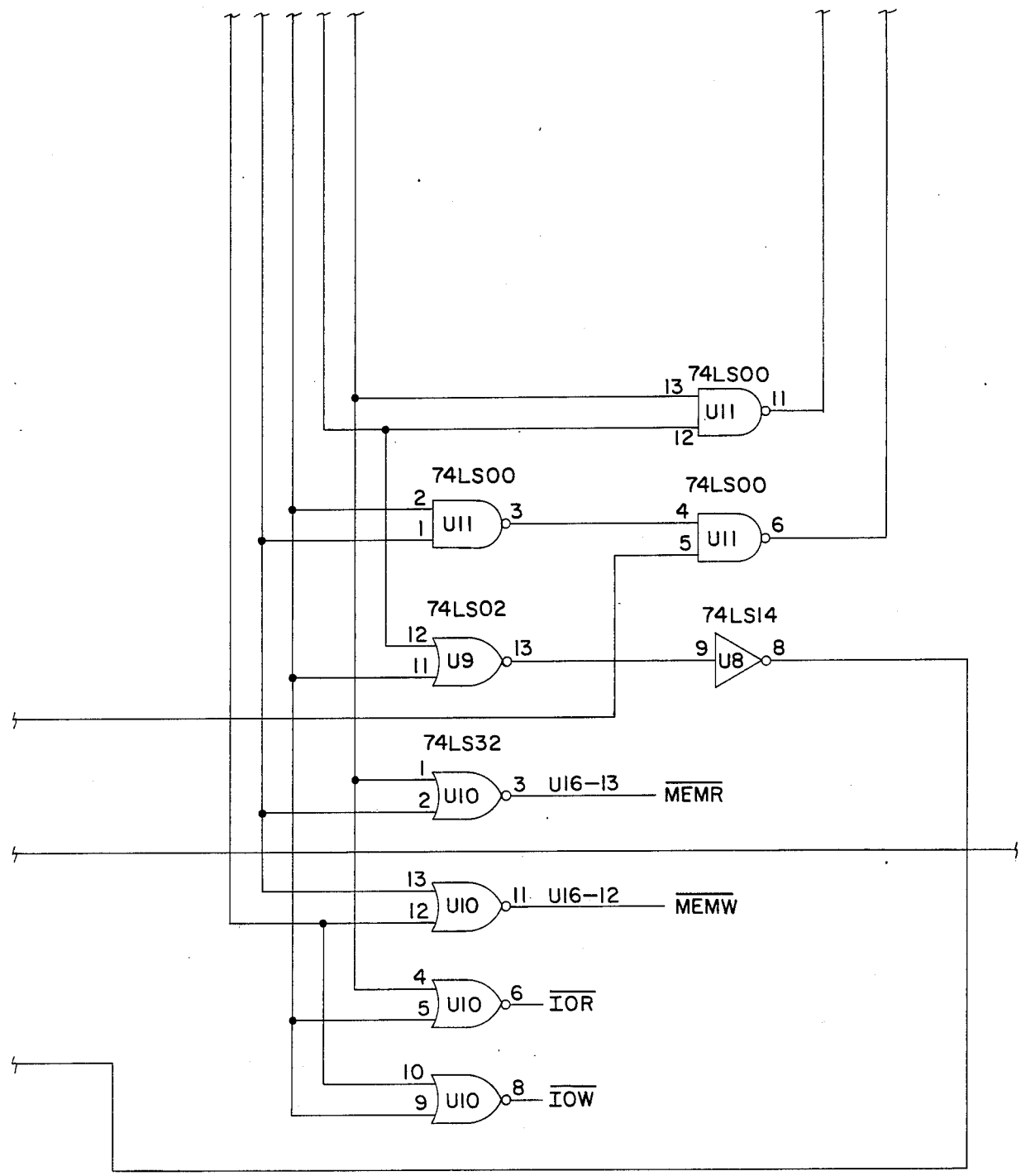
Figure 5G:
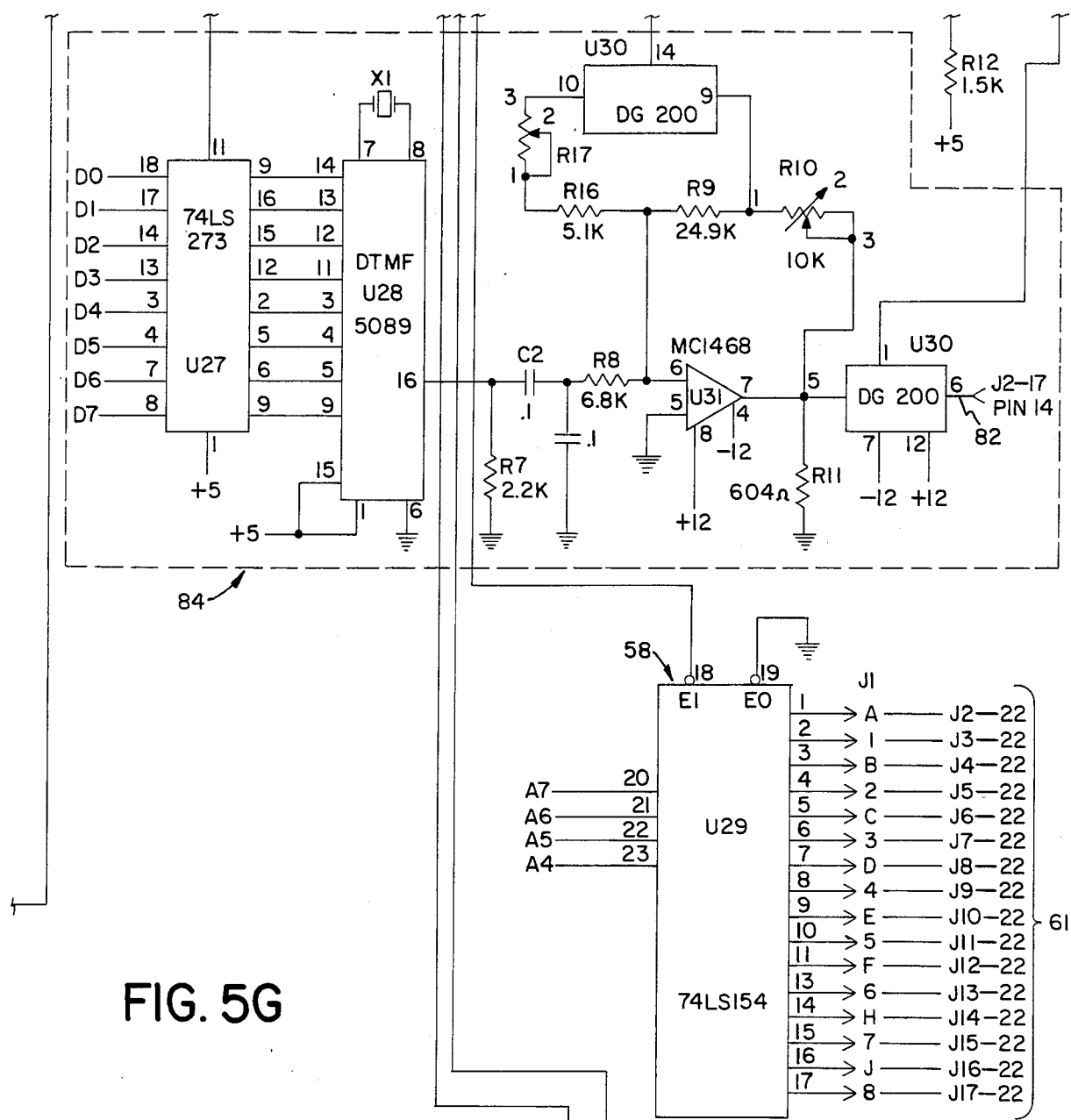
Figure 5G:
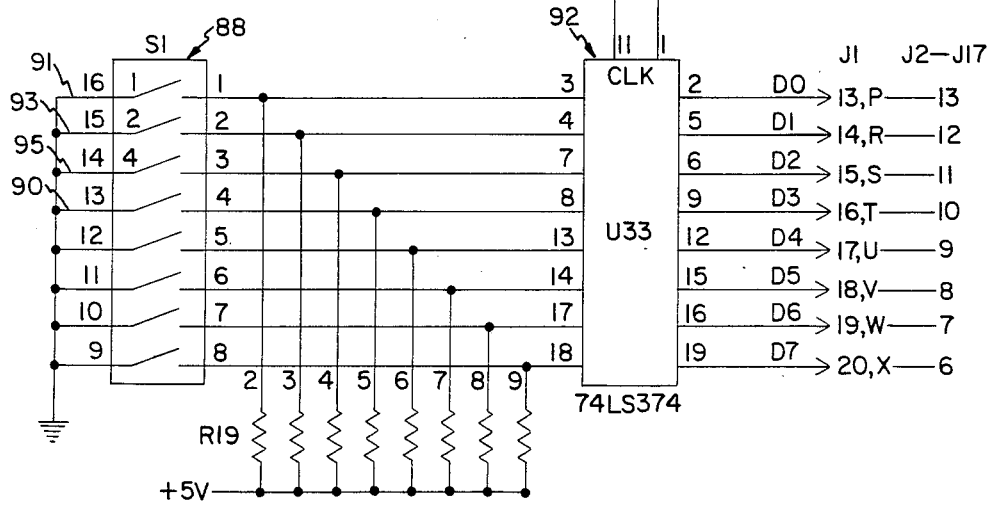
Figure 5H:
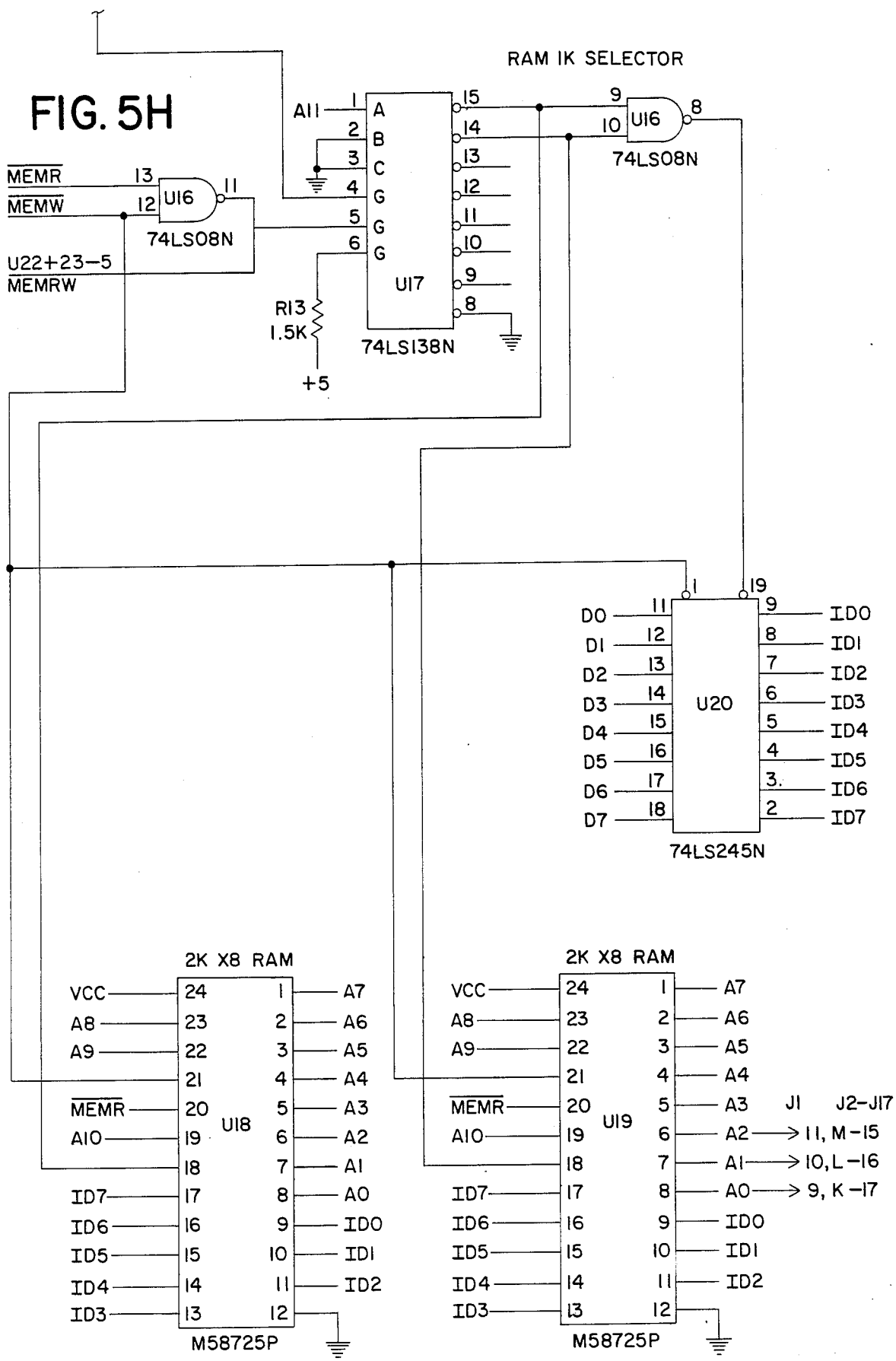

The trunk identification system 20 further comprises a data and control bus 26 interconnected between the identification control module 22 and each interface module 24. This bus as shown in FIG. 4C comprises eight data lines (D0-D7), three address lines (A0-A2) (these address lines are part of the sixteen address lines 57 associated withcentral processing unit 54—see FIG. 5B—) from the identification control module central processing unit, sixteen card (module) select lines 57 (see FIG. 5G lines J2-22 through J17-22), a DTMF line 82, and ground and power supply lines (grd, +12 V, −12 V and +5 V). The card select line 61 comprises a unique line for each inbound trunk interface module, and therefore as seen in FIG. 5G, comprises sixteen separate lines J2-22 through J17-22 emanating from the identification control module, one line for each of the sixteen interface modules 24.

The test control system tests the inbound trunks by calling a number associated with these inbound trunks and then accessing the far end tone control and measurement system. Test tones and measurements are made between test control system 32 and the responding tone control and measurement system 30 with the results of measurements made by the tone control and measurement system sent back to the test control system.

Following completion of a test routine for a single inbound trunk, the tone control and measurement system generates a unique signal (typically a DTMF "D" tone) for a predetermined length of time (typically 300 msec) which is sensed by the trunk identification system 20 via the appropriate module 24 connected across the particular tested inbound trunk. Since neither the test control system 32 nor the tone control and measurement system 30 knows the actual inbound trunk selected by central office 39, it is the function of the trunk identification system to make this determination The trunk identification system can make this determination since the "D" DTMF tone generated by the tone control and measurement system is only transmitted on the tested inbound trunk. Since each inbound trunk is connected to an inbound trunk interface module, the appropriate module can make the trunk determination by sensing the generated "D" tone on one of the eight inbound trunks which that interface module samples.

Once sensed, the trunk identification system generates a series of DTMF tones (usually four DTMF tones corresponding to a four-digit number) onto the tested inbound trunk. This number uniquely identifies the tested trunk. The near end test control system receives these tones and thus knows the particular inbound trunk selected by the central office and tested by it (the test control system 32) and the tone control and measurement system 30.

In order to accomplish the detection of the "D" tone generated upon completion of a test sequence, the trunk identification system sequentially samples (scans) each of the inbound trunks on a periodic, repetitive basis.

Furthermore, upon detection of a "D" tone, the trunk identification system ensures that the detected "D" tone accurately represents only a single inbound trunk, and if so it proceeds to identify the tested trunk by transmitting onto the inbound trunk its identification number. This identification number is then received by the test control system so that it can record the identity of the tested inbound trunk.

Furthermore, depending upon the hunt routine used by the local telephone company central office to select an inbound trunk, the interface module can "busy out" the tested trunk so as to prevent the trunk from being reselected by the central office during an overall test procedure in which each inbound trunk is to be tested by the near end test control system 32 in combination with the far end tone control and measurement system 30.

Figure 2A:
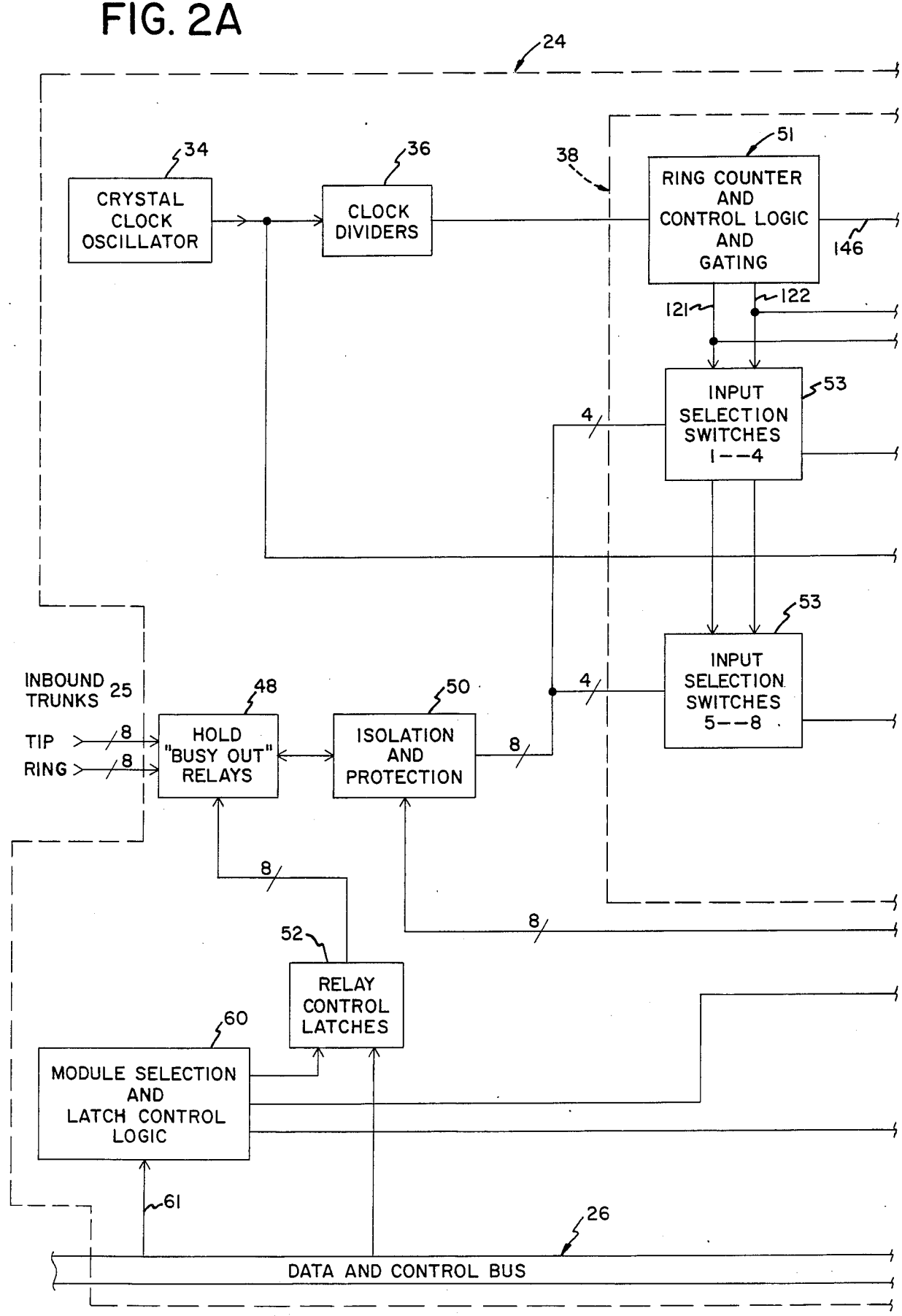

FIG. 2 is a detailed block diagram of the inbound trunk interface module 24 illustrating that it comprises a crystal clock oscillator 34, clock dividers 36, a dual-tone multifrequency (DTMF) decoder module 38, as well as detection latches 40, identification response encoder/-latches 42, trunk identification output select switches 44, hold "busy out" relays 48, isolation and protection circuitry 50 as well as relay control latches 52. The DTMF decoder module includes a ring counter and control logic and gating module 51, input selection switches 53, DTMF tone decoders 55, and output logic modules 102 and 103.

Operation of the Trunk Identification System Scanning Routine

The actual operation of the trunk identification scanning of the inbound trunks so as to determine if the testing of an inbound trunk has been completed as indicated by tone control and measurement system 30 generation of a unique DTMF tone, comprises a number of steps which are performed by the identification control module 22 and the associated inbound trunk interface modules 24 shown in FIG. 1.

As best seen in FIG. 5 comprising FIGS. 5A-5H, the control module 22 comprises a microprocessor 54 under program control as stored in EPROM's 56. The control program is presented in Table 1.

TABLE 1

```
*
*               THIS IS RSEG DID
*               SOFTWARE FOR THE DIDID SYSTEM
*
.

ASEG
        GLOBAL
        ORG     0000
        DI
        LD      SP,STACK
        JP      PWRUP
        ORG     X'38'
IVCTR   EX      AF,AF'                  INTERRUPT SERVICE ENTRY
        EXX
        JP      ISR
        RSEG    DID                     CJC
*       ORG     X'100'                      CJC
*
*
*
* INITIALIZATION SECTION
*
*
*
PWRUP   DI
        LD      A,X'FF'                 CLEAR ALL OUTPUT LATCHES AND CLOCK
        LD      (TONEP),A               ALL INPUT LATCHES
        LD      (TNSWCH),A
        LD      HL,ONEONE
        LD      DE,CARD0
        LD      B,X'00'
CLEAR1  XOR     A
        LD      (DE),A                  CLEAR BUSY LINE STATUS MEMORY
        LD      A,X'FF'
        LD      (HL),A                  50X1: AUDIO OUTPUT ENABLE
        INC     HL
        LD      (HL),A                  50X2: BUSY LINE LATCH
        INC     HL
        LD      (HL),A                  50X3: STROBE ACTIVE LINE LATCH
        DEC     B
        JP      Z,CLEAR2
        LD      A,L
        AND     X'F0'
        ADD     A,X'10'
        LD      L,A
        INC     DE
        JP      CLEAR1
CLEAR2  LD      HL,RAMBG+257            INIT MEMORY GENERALLY, BEG OF RAM
```

```
            LD      DE,RAMBG+258        CLEAR MEMORY- INITIALIZE AT ZERO
            LD      BC,RAMSZ               ENOUGH TO CLEAR FOR FLAG USE.
            LD      A,0
            LD      (HL),A
            LDIR                        CLEAR IT!
            LD      HL,MIN5             MIN5= FIVE MINUTE DECREMENT
            LD      (CLOCK),HL          INITIALIZE TIMEOUT CLOCK, NO ACTIVITY
            EI
            IM1
*
*
*           BEGINING OF MAIN PROGRAM
*

START       LD      A,(OTRBSY)          SEE IF ANY OTHER BANK IS ACTIVE
            BIT     0,A                 ACTIVE LOW
            JP      NZ,STARTX           SKIP IF NOT ACTIVE
            LD      HL,MIN5             RESET ACTIVE TIMER
            LD      (CLOCK),HL
STARTX      LD      A,(SWITCH)          IS SYSTEM A "BUSY-OUT" SYSTEM
            BIT     3,A
            JP      NZ,START1           SKIP IF NOT
            LD      HL,(CLOCK)          SEE IF NO LINE ACTIVE FOR 5 MINUTES
            LD      A,H
            OR      L
            JP      NZ,START1
            LD      HL,BSYCTR           IF NO ACTIVE LINE, UNBUSY ALL LINES
            LD      A,L
            OR      X'02'
            LD      L,A
            LD      B,16                NO. OF CARDS TO CLEAR
            LD      DE,X'10'            ADDRESS OFFSET BETWEEN CARDS
NXTLCH      LD      A,X'FF'             RELEASE OFF HOOK LATCHES
            LD      (HL),A
            ADD     HL,DE
            DEC     B
            JP      NZ,NXTLCH
            LD      HL,CARD0            CLEAR BUSY LINE STATUS MEMORY
            LD      B,16
            LD      A,0
MIR1        LD      (HL),A
            INC     HL
            DEC     B
            JP      NZ,MIR1
            LD      HL,MIN5             RE-INIT TIMER
            LD      (CLOCK),HL
START1      LD      HL,BSYCTR           ADDRESS OF FIRST CARDS
            LD      B,16                NUMBER OF CARDS TO TEST
            LD      DE,X'10'
SERCH       CALL    LNSTRB              STROBE ACTIVE LINE LATCH
            LD      A,L                 SET ADDRESS TO ACVTIVE LINE LATCH
            AND     X'F0'
            LD      L,A
            LD      A,(HL)              READ ACTIVE LINE LATCH (INVERTED)
            CP      X'FF'               IF 'FF', NO LINE ACTIVE
            JP      NZ,SERCH1           START PROCESSING,IF LINE ACTIVE
            ADD     HL,DE               INCREMENT HL TO NEXT CARD ADDRESS
            DEC     B                   DECR. CARD COUNTER
            JP      Z,START             IF SO, START ON FIRST CARD AGAIN
            JP      SERCH               OTHERWISE, TRY NEXT CARD
SERCH1      LD      C,A                 WAIT FOR ACTIVE LINE D TONE TO GO
            WAIT    4                   AWAY BEFORE FURTHER PROCESSING
            CALL    LNSTRB
            LD      A,(HL)
            CP      C
            JP      Z,SERCH1            KEEP WAITING IF LINE STILL ACTIVE
            LD      A,C
            CALL    LNSTRB
            PUSH    AF                  SAVE ACTIVE LINE ID (INVERTED)
            LD      A,L                 CALCULATE CURRENT CARD AUDIO OUT LATCH
            AND     X'F0'               ADDRESS
```

```
            OR      X'01'
            LD      L,A
            POP     AF              FETCH ACTIVE LINE ID (INVERTED)
            LD      (HL),A          SET AUDIO OUT LATCH FOR ACTIVE LINE
            LD      (STATUS),A      SAVE ACTIVE LINE ID IN MEMORY
            PUSH    AF
*           LD      A,X'00'
*           LD      (TNSWCH),A      TURN ON DTMF ENCODER
            POP     AF
            LD      (CURCRD),HL     SAVE CURRENT CARD ADDRESS
            LD      B,0             LOAD "B" WITH INIT. BIT COUNT
CRDAD       BIT     0,A             TEST FOR ACTIVE BIT
            JP      Z,CKTNO         "B" CONTAINS ACTIVE LINE BIT LOCATION
            SRL     A               IF NOT HERE, SHIFT RT. AND LOOK AGAIN
            INC     B               INCR. BIT LOCATION
            JP      CRDAD
*
*IF THERE IS MORE THAN ONE BOX WITH SIXTEEN CARDS, 8 LINES EACH, THE FOLLOWING
* READS A SWITCH TO DETERMINE WHICH OF 8 POSSIBLE 128 LINE SYSTEMS IT IS.
*EG. FIRST BOX HAS ID'S 0000 THROUGH 0127. SECOND BOX HAS ID'S 0128 THROUGH
*0255, ETC. *
CKTNO       LD      HL,0            CALCULATE STARTING LINE ID NO.
            LD      DE,128
            LD      A,(SWITCH)
            CPL
            AND     X'07'           USE LOWER 3 SWITCHES IN BINARY
BOXES       CP      0
            JP      Z,LODB
            ADD     HL,DE
            DEC     A
            JP      BOXES
LODB        PUSH    HL              ADD STARTING LINE ID TO ACTIVE LINE
            POP     DE              ID, WHICH IS CARD ADDRESS OFFSET PLUS
            LD      HL,(CURCRD)     ACTIVE LINE BIT POSITION CALCULATED
*                                   RESTORE CURRENT CARD ADDRESS
            LD      A,L
            SRL     A
            ADD     A,B
            PUSH    DE
            POP     HL
            LD      C,A
            LD      A,0
            LD      B,A
            ADD     HL,BC
            CALL    B2BCD           CONVERT ACTIVE LINE ID NUMBER TO BCD
            WAIT    8
            LD      A,H             OUTPUT FIRST (MOST SIGNIFICANT) DIGIT
            SRL     A               OF ACTIVE LINE IDENTIFICATION NUMBER
            SRL     A
            SRL     A               NOTE, IT IS IN UPPER NIBBLE AND MUST
            SRL     A               BE SHIFTED TO LOWER NIBBLE POSITION
            AND     X'0F'
            PUSH    HL
            LD      A,X'00'
            LD      (TNSWCH),A      TURN ON DTMF ENCODER
            CALL    TONE
            POP     HL
            LD      A,H             OUTPUT SECOND DIGIT
            AND     X'0F'
            PUSH    HL
            CALL    TONE
            POP     HL
            LD      A,L             OUTPUT THIRD DIGIT, ALSO IN UPPER
            SRL     A               NIBBLE, HENCE SHIFTING TO LOWER
            SRL     A
            SRL     A
            SRL     A
            AND     X'0F'
            PUSH    HL
            CALL    TONE
            POP     HL
            LD      A,L
            AND     X'0F'
```

```
        CALL    TONE
        LD      HL,(CURCRD)         RESTORE CURRENT CARD ADDRESS
        LD      A,L                 CLEAR AUDIO OUTPUT LATCH
        AND     X'F0'
        OR      X'01'
        LD      L,A
        LD      A,X'FF'
        LD      (HL),A              TURN OFF TONE OUTPUT ENABLE
        LD      (TNSWCH),A
        LD      A,(SWITCH)          SKIP IF NOT BUSY OUT SYSTEM
        BIT     3,A
        JP      NZ,START            DONE IF NOT A BUSY OUT SYSTEM
        PUSH    DE
        PUSH    HL
        LD      HL,X'1D05'          RESET TIMER
        LD      (CLOCK),HL
        LD      A,(STATUS)          FETCH ACTIVE LINE ID
        CPL
        LD      B,A
        POP     HL
        PUSH    HL
        LD      A,L                 CALCULATE CARD OFFSET
        SRL     A
        SRL     A
        SRL     A
        SRL     A
        AND     X'0F'
        LD      DE,CARD0            ADD CARD OFFSET TO BUSY LINE STATUS
        LD      L,A
        LD      H,0
        ADD     HL,DE
        LD      A,(HL)              FETCH THIS CARD'S BUSY LINE STATUS
        OR      B                   ADD IN ACTIVE LINE
        LD      (HL),A              UPDATE STATUS
        POP     HL                  RESTORE BUSY LATCH ADDRESS
        POP     DE
        CPL                         INVERT
        INC     HL
        LD      (HL),A              SET BUSY OUT LATCH
        JP      START
*
*STROBE ACTIVE LINE ID LATCH
*       THIS WILL CAUSE THE ACTIVE LINE ID LATCH CONTENTS FOR THE CURRENT
*       CARD TO BE STROBED, AND THE DATA HENCE UPDATED TO SHOW THE STATUS
*       OF THE LINES GOING INTO THE CUURENT CARD, IE. DOES ONE OF THEM DETECT
*       A "D" TONE?
*
*       ENTRY:  HL HAS 50NX, WHERE N= NUMBER OF CUURENT CARD, 0-F,X=DONT CARE
*       EXIT:   NO REGISTERS CHANGED, LATCH HAS BEEN STROBED
*
LNSTRB  PUSH    AF
        PUSH    HL
        LD      A,L
        AND     X'F0'
        OR      X'03'
        LD      L,A
        LD      A,(HL)
        POP     HL
        POP     AF
        RET
*
*
*BIN TO BCD
*       ENTRY:HL=BINARY 0-9999
*       EXIT: HL=BCD 0-9999
B2BCD   LD      DE,1000             HOW MANY THOUSANDS?
        CALL    CNVT
        SLA     A                   SINCE WE HAVE FOUR DIGIT BCD RESULT,
        SLA     A                   PUT MSDIGIT IN UPPER NIBBLE OF HI BYTE
        SLA     A
        SLA     A
        AND     X'F0'               CLEAR ANY TRASH
        PUSH    AF                  SAVE THOUSDASNDS DIGIT
```

```
              LD      DE,100              HOW MANY HUNDREDS?
              CALL    CNVT
              LD      B,A                 PUT HUNDREDS DIGIT WITH THOUSANDS
              POP     AF                  FETCH THOUSANDS DIGIT (IN UPPER NIBBLE)
              OR      B
              LD      B,A
              PUSH    BC
              LD      DE,10               HOW MANY TENS?
              CALL    CNVT
              SLA     A                   PUT TENS DIGIT IN UPPER NIBBLE OF LO
              SLA     A                   ORDER BYTE
              SLA     A
              SLA     A
              AND     X'F0'
              OR      L                   L HAS ONES DIGIT BY DEFAULT
              POP     HL
              LD      L,A
              RET
*             PART OF B2BCD
*             ENTRY:HL HAS BINARY NUMBER
*                   DE HAS PLACE VALUE OF DIGIT TO BE CONVERTED (10,100,1000)
*             EXIT: A  HAS NUMBER OF (DE'S) CONTAINED IN (HL)
*                   DE UNCHANGED
*                   HL= HL-(A)*(DE)
*
CNVT          XOR     A                   CLEAR ACCUMULATOR AND CARRY BIT
CNVT1         SBC     HL,DE               TEST SUBTRACT
              JP      C,CNVT2             IF CARRY, ONE TOO MANY
              INC     A                   IF NOT, INCREASE BCD COUNT
              JP      CNVT1
CNVT2         ADD     HL,DE               ADD IN EXTRA SUBTRACT
              RET
*
*
* ENTRY: A=KEYSTROKE  FROM TOUCHTONE PAD
* EXIT:  TONE OUTPUT, ONLY A REG CHANGED
*        CODE: SEE TABLE BELOW
*
*  KEY    CODE    TONE CODE
*   0     16      D7
*   1     9       EE
*   2     13      DE
*   3     17      BE
*   4     10      ED
*   5     14      DD
*   6     18      BD
*   7     11      EB
*   8     15      DB
*   9     19      BB
*   *     12      E7
*   #     20      B7
*   ---   21      CE
*
TONE          LD      HL,TNTBL            ADDRESS OF TONE CODE TABLE
              LD      E,A
              LD      D,0
              ADD     HL,DE               CALCULATE TONE TABLE ENTRY ADDRESS
              LD      A,(HL)              FETCH TONE CODE
              LD      (TONEP),A
              WAIT    3                   WAS 5
              LD      A,X'FF'
              LD      (TONEP),A
              WAIT    2                   WAS 5
TNRET         RET
LEFT          AND     X'0F'
              LD      B,A
              LD      A,(HL)
              RRC     A
              RRC     A
              RRC     A
              RRC     A
              AND     X'0F'               THIS WILL BE THE CARRY OUT
              PUSH    AF
```

```
                LD      A,(HL)
                RLCA
                RLCA
                RLCA
                RLCA
                AND     X'F0'
                OR      B
                LD      (HL),A           STORE RESULT
                POP     AF               THIS IS THE CARRY OUT
                DEC     HL
                RET
***********************************************
*
* INTERRUPT SERVICE ROUTINE
*

*
***********************************************
*       ENTRY: FORTY MILLISECOND INTERRUPT
*       EXIT:  TIME/DATE UPDATED
*              INTERNAL TIMER DECREMENTED TO ZERO
*              KEYBOARD SCANNED
*              CHECK FOR TIME TO RUN TEST
*
ISR             LD      HL,(CLOCK)       DECREMENT "NO TEST TIMER"
                DEC     HL
                LD      (CLOCK),HL
                LD      A,(TIMER)
                DEC     A
                LD      (TIMER),A
ISRET           EX      AF,AF'
                EXX
                EI
                RET
TNTBL           DC      X'D7',X'EE',X'DE',X'BE'   0,1,2,3
                DC      X'ED',X'DD',X'BD',X'EB'   4,5,6,7
                DC      X'DB',X'BB'               8,9
ONE             EQU     X'5002'
ONEONE          EQU     X'5001'
ONESIX          EQU     X'5003'
RAMBG           EQU     X'2000'
RAMSZ           EQU     X'1000'
TONEP           EQU     X'4000'
TNSWCH          EQU     X'6000'
BSYCTR          EQU     X'5000'
SWITCH          EQU     X'7000'
MIN5            EQU     X'1D05'           FIVE MINUTE TIME COUNT...
OTRBSY          EQU     X'3000'           OTHER BOX BUSY LINE
                END
```

```
                RSEG    DEFS
                GLOBAL
***********************************************
*
*
* RAM STORAGE DEFS
*
*
*
                ASEG
                ORG     2000H
                DS      255              RESERVED FOR STACK AREA
STACK           DS      1
RDNG            DS      3
TIMER           DS      1
CARDO           DS      16
*MATH PACKAGE UTILITY STORAGE
AUGEND          DS      4
ADDEND          DS      4
ICAND           DS      4
```

```
IER      DS   4
PRODX    DS   1
PROD     DS   4
SRC1     DS   4
SRC2     DS   4
SUM      DS   4
SUM1     DS   4
HOLD     DS   4
LNFLG    DS   1
CALIBR   DS   4
TWNKL    DS   1          FLAG FOR POWER ON FLASH DISPLAY
TCNT     DS   1          COUNTER FOR CYCLE OF FLASH
CLOCK    DS   2
STATUS   DS   1
CURCRD   DS   2          CURRENT CARD ADDRESS
         END
```

The microprocessor controls the generation of a sequence of card select signals through the demultiplexer 58 on card select lines 61 identified as J2-22 through J17-22. These lines control which interface module 24 is to enabled for a predetermined length of time as explained earlier, each interface module is physically connected to one of these lines at input 5 of decoder 60 (see FIG. 4A). Thus, each card select line when in a low or zero state enables one of the interface modules 24 by enabling the card select input on 3 to 8 decoder 60 forming part of each interface module (see FIG. 4A).

Each interface module is able to detect a "D" tone for eight inbound trunk lines. Lines A0, A1 and A2 of decoder 60 control its operation if this interface module has been selected by receiving a low signal on its card select input 61.

Inputs A0, A1 and A2 of decoder 60 are address lines from CPU 54 (see FIG. 5B) and form part of bus 26. When these three lines are in a 011 configuration (i.e., line A0 is in a zero state, line A1 is in a one state and line A2 is in a one state), a one to zero transition occurs at pin 12 of decoder 60, which is connected to the clock pulse input 64 of detection latches integrated circuit 40. This transition prepares the latches for input data via lines X1 through X8. Detection latches 40 require a zero to one transition to enable such input data. This result is achieved by having input lines A0, A1 and A2 of decoder 60 enter a 0, 0, 0 state which causes a zero to one transition on the CP input 64, latching the X1 to X8 states into detection latches 40.

At the same time that the CP input is undergoing a zero to one transition latching the X1 to X8 states into detection latches 40, pin 15 of decoder 60 becomes true (enters the zero state) which enables the output enable input (OE) 66 of detection latches 40. This result in turn enables the latched data in integrated circuit (IC) 40 to be output as data on data lines D0 through D7.

When this data is enabled, the control module 22 interrogates these data lines to determine if any single line is in a low state, indicative of an inbound trunk line having completed a test routine by the tone control and measurement system 30 generating a "D" tone as detected by the DTMF decoder module 38 (see FIG. 2). The actual manner in which the "D" tone is detected is discussed later.

Otherwise when a single data line D0-D7 is determined to be in the low state, the control module determines which line is in the low state and then determines to which inbound trunk this low line corresponds. The identification control module 22 also determines a four-digit identification number associated uniquely with the identified inbound trunk. This unique four-digit number is calculated by the CPU under program control (see Table 1). Thus, for a maximumly configured trunk identification system using 16 interface modules 24, up to 128, four digit inbound trunk identification numbers from 0000 to 0127 are calculated by the CPU for inbound trunks 0 to 127 respectively. Of course, more inbound trunks can be identified by simply adding additional trunk identification systems (which can be tandemed together via lines 63 of FIG. 5 for a maximally configured overall system of eight trunk identification system capable of identifying up to 1024 inbound trunks). The number generated by these additional trunk identification systems is proportional to a number associated with each system as determined by switches 91, 93 and 95 of switch bank 88.

Thus if switches 91, 93 and 95 are all open, the trunk identification system is considered the first of up to eight trunk identification systems and thus zero is added to the inbound trunk number. For the next trunk identification system, switches 91, 93 and 95 are closed, open, open, respectively, and 128 is added to the inbound trunk number. Thus the trunk numbers would range from 128 through 255. This technique is repeated for each additional trunk identification system, and thus for the eight trunk identification systems 896 is added to the inbound trunk number (the trunk numbers therefore range from 896 through 1023.

Furthermore, through input lines A0, A1 and A2 to decoder 60, the controller module keeps interrogating the status of the "D" tone lines (X1-X8 input to detection latches 40) by repeatedly clocking and enabling the detection latches until the data line which entered a low state (indicative of detection of a "D" tone) again returns to the high state. When the tone line returns to the high state, the "D" tone time period has passed. At this time, the control module 22 writes data to the D0-D7 lines with a zero on the appropriate data line. The A0-A2 address lines entering decoder 60 are brought to a 001 state which causes a one to zero transition on the CP input 68 of register 70. Register 70 in combination with 8 to 3 encoder 72 form the identification response encoder/latch module 42 shown in FIG. 2B.

When the 001 input states to lines A0-A2 are removed, a zero to one CP transition occurs on CP input 68 which causes the data byte on address lines D0-D7 to be latched into latch 70. Integrated circuit 72 is a priority encoder which encodes the eight bits of latched output from latch 70 and converts them into a three-bit binary code on outputs 74, 75 and 76 so as to control the one of eight analog multiplexer forming the trunk identification output selection switch 44. In operation, the analog multiplexer decodes the zero or one state of outputs 74, 75 and 76 so as to determine which tip and ring input circuit 80 is to be driven by the four DTMF tones representative of the inbound trunk line which has just been tested. These four DTMF tones are brought to the analog multiplexer 44 via input 82 as generated by DTMF tone generation circuitry 84 forming part of the control module 22 (See FIG. 5).

The tip and ring input circuit transmits the DTMF tones from the analog multiplexer 44 through coupling transformer 86 to the selected tip and ring lines corresponding to the inbound trunk for which the test procedure has just been completed. Since the near end test control system 32 is waiting for the four DTMF tones which identify the tested inbound trunk, the receipt of these four DTMF tones enables the near end control system 32 to ascertain which inbound trunk corresponds to the test results previously obtained.

The four identification tones associated with the selected inbound trunk are thus output under control of identification control module 22. Following this procedure the control module, clears latch 70 by placing each data line D0-D7 in a one state (representing a data byte thus FF hexidecimal, where 11111111 binary is equal to FF hexidecimal) which then clears the data previously latched into latch 70.

Next control module 22 reads the status of the fourth switch position of selection switches 88 (see FIG. 5G) which indicates to the control module whether a "busy out" feature needs to be employed. Switch position 90 is read by octal latches 92. If the switch is in a closed state, a "busy out" requirement is to be set for each inbound trunk tested.

As indicated earlier, a top-down rotary hunt procedure if employed by the telephone company to select inbound trunks causes the first available inbound trunk to be selected for a given overall trunk sequence. Thus if 20 inbound trunks exist, the hunt routine causes each sequential trunk to be used if the previous trunks are already in use. Therefore if trunks 1 and 2 are already in use and another call comes in, trunk 3 is selected. If, however, another call comes in and if trunk 2 is then available (that is, the caller on trunk 2 has hung up), then trunk 2 would be selected rather than inbound trunk 4. Therefore, in order to be able to test all of the inbound trunks, it is necessary to maintain a tested trunk in an "off hook" condition which is sometimes referred to as "maintaining it in a 'busy out' condition." It should be noted however that this "busy out" feature only operates properly if the telephone company central office does not employ originating end supervision in order to determine the termination of a telephone call (normally central offices use terminating end supervision to determine the termination of a telephone call).

If this feature is required, address 010 is transmitted to decoder 60 via the control module which, in turn, allows an updated data byte from the data lines to pass to relay control latches 52. The data byte transmitted to the latch 52 is a function of which lines have previously responded as well as the present line which has responded.

For example, if inbound trunks 4 and 5 have previously been tested and identified by the trunk identification unit, the information brought to latch 52 would appear as follows:

|            | D0 | D1 | D2 | D3 | D4 | D5 | D6 | D7 |
|------------|----|----|----|----|----|----|----|----|
| Data Byte #1 | 1 | 1 | 1 | 0 | 0 | 1 | 1 | 1 |

It is thus seen that data lines 3 and 4 are in the zero state indicating that those respective inbound trunks have been tested. Since the data lines are referred to as D0-D7, they correspond to inbound trunks 1-8 and thus inbound trunks 4 and 5 correspond to data bits 3 and 4, respectively.

If the next data line identified is line 6 (that is, a "D" tone has been detected by the trunk identification unit inbound trunk 7) then the last byte would be as follows:

|            | D0 | D1 | D2 | D3 | D4 | D5 | D6 | D7 |
|------------|----|----|----|----|----|----|----|----|
| Data Byte #2 | 1 | 1 | 1 | 1 | 1 | 1 | 0 | 1 |

If data byte 1 is "Anded" with data byte 2, the result is:

|            | D0 | D1 | D2 | D3 | D4 | D5 | D6 | D7 |
|------------|----|----|----|----|----|----|----|----|
| Data Byte #3 | 1 | 1 | 1 | 0 | 0 | 1 | 0 | 1 |

This information is then output to relays Z1 through Z8, where relay Z1 is associated with relay coil 94 causing it to be energized via the +5 volt source which, in turn, causes relay contact 96 to close thereby putting resistor 98 across the tip and ring lines for that inbound trunk. This input resistor thereby presents a load across the tip and ring lines of the inbound trunk which resembles the load associated with an "off-hook" condition. Therefore, the central office keeps this inbound trunk in an "off hook" condition, preventing it from being reaccessed by the hunt routine. It should be noted that the tip and ring circuit 80 shown in FIG. 4A is repeated for each of the eight inbound trunks that can be identified by the selected inbound trunk interface module 24.

In the example given above, the tip and ring lines corresponding to Z4, Z5 and Z7 would have a resistive load placed across their respective tip and ring lines.

Thus by latching this updated byte (data byte 3) into latch 52, the relays for lines 4, 5 and 7 are energized so as to prevent these lines from being accessed by the central office top-down rotary hunt routine. The actual latching of latch 52 is caused by the CP input 100 transitioning from a zero to one state as a result of decoder 60.

Figure 3A:
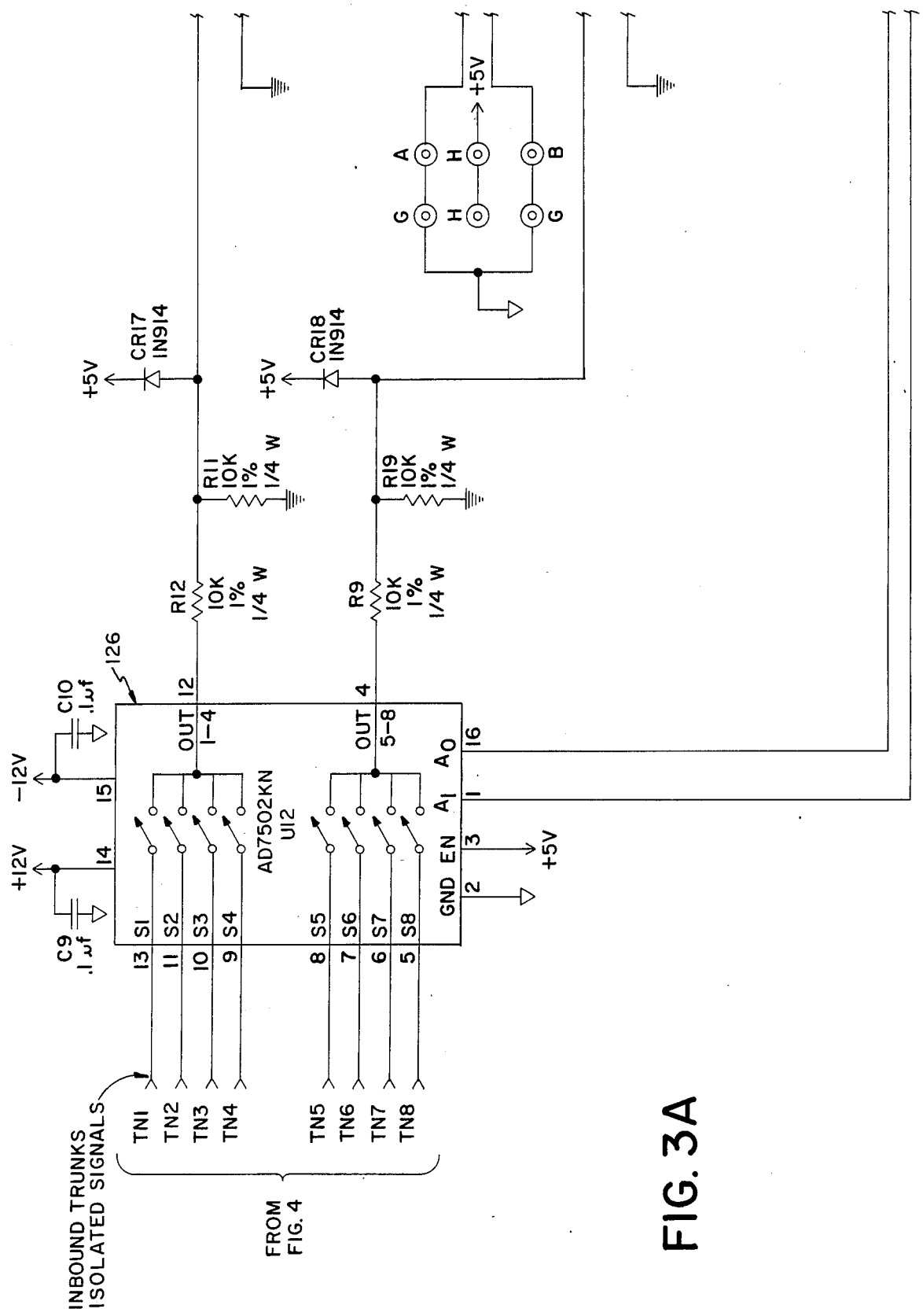
FIGS. 3A, 3B and 3C, is an overall schematic diagram of the multiplexer, dual-tone multi-frequency receiver and decoder and associated logic and latching circuitry forming part of the trunk identification system interface module shown in FIGS. 1 and 2.
Figure 3B:
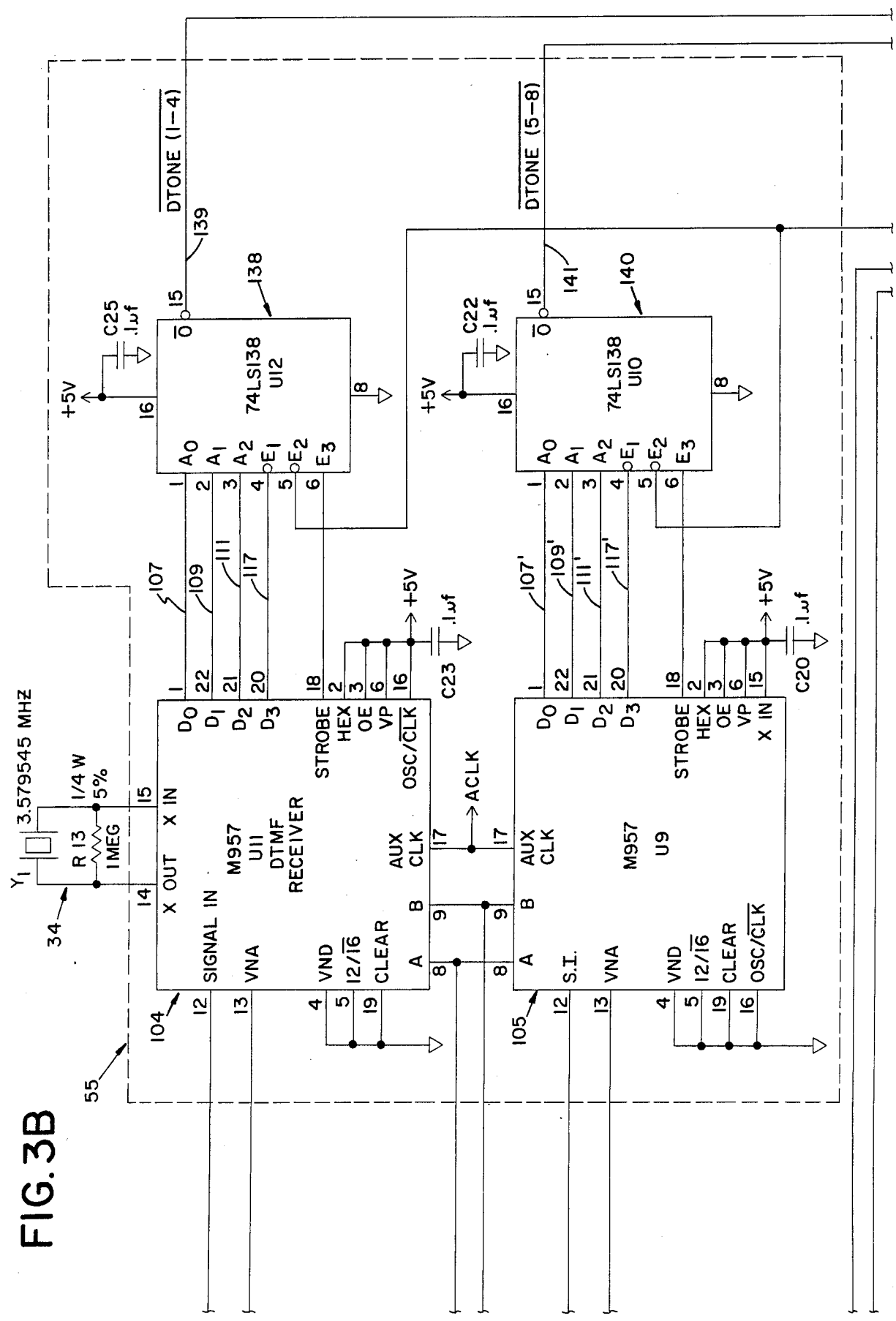
Figure 3C:
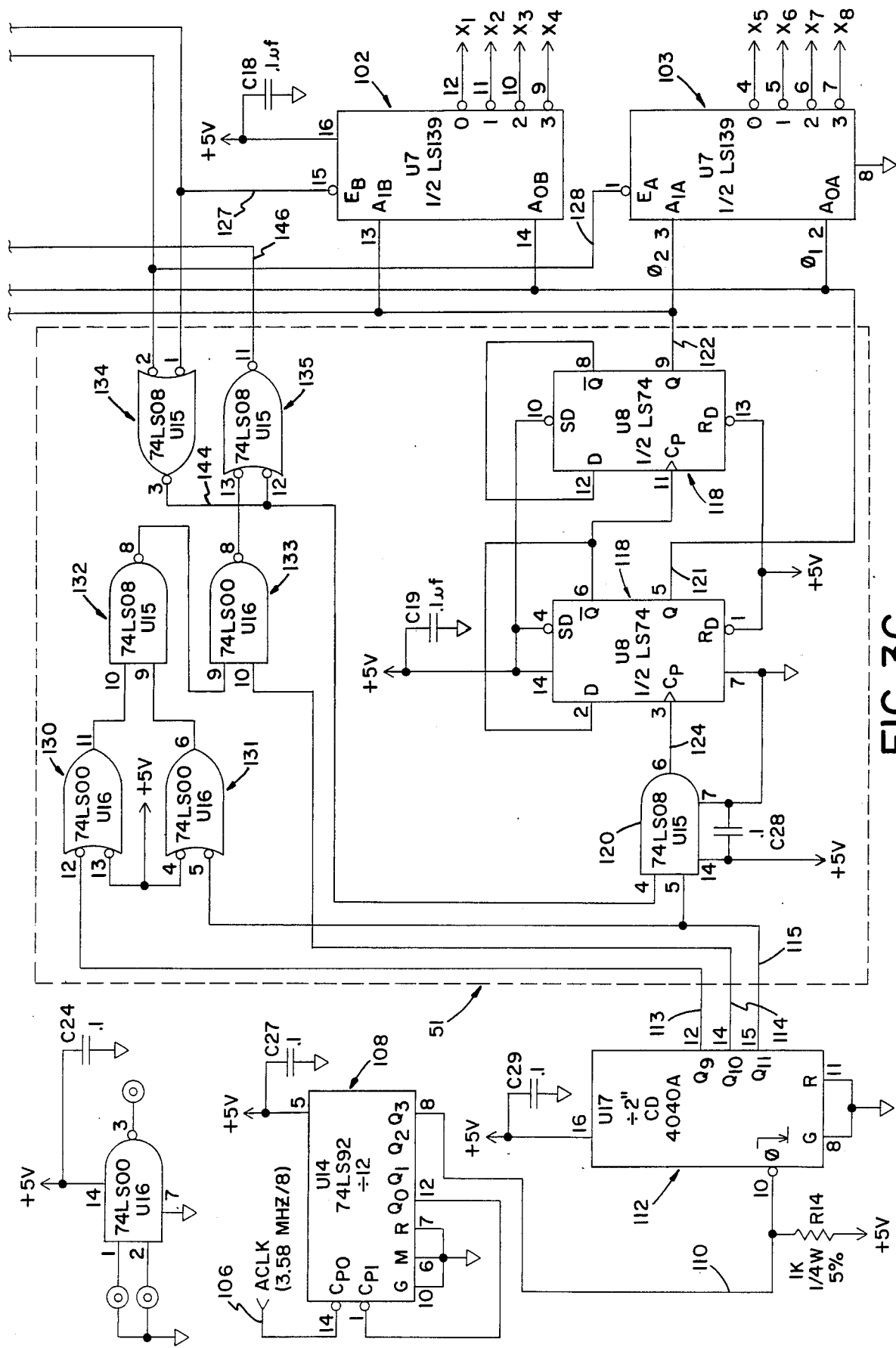

As seen in FIG. 3C, the 0 or 1 state for the X1 through X8 outputs is obtained from two, two to four decoders 102 and 103. These outputs are in a zero state if the corresponding inbound trunk is found to have a "D" tone present as a result of the tone control and measurement system 30 generating such a tone at the completion of a test sequence. The generation of the outputs on lines X1 through X8 is presented in the following section.

Detection of the "D" DTMF Tone

FIGS. 3A-3C illustrate the manner by which the DTMF tone generated on the tip and ring inbound trunks via the tone control and measurement system 30 is detected by the trunk identification system. As there seen, the crystal and clock oscillator 34 is crystal controlled to a frequency of 3.579545 megahertz. This signal is connected to the Xin and Xout inputs of the DTMF receiver 104. Receiver 104 generates a signal on output 106 ($A_{clk}$) which is equal to the clock frequency divided by eight, i.e., 447,443.12 hertz. Integrated circuit 108 is a divide by 12 counter so as to provide an output frequency on line 110 equal to 37,286.926 hertz. Divider circuit 112 has outputs 113, 114 which respectively represent a division of this clock frequency by $2^9$, $2^{10}$, and $2^{11}$ having resultant output frequencies of 72.826 hertz, 36.413 hertz and 18.2065 hertz, respectively. This latter frequency has a period of approximately 55 milliseconds.

Flip flops 118 form a ring counter in conjunction with output 124 from AND gate 120 so that at outputs 121 and 122 the following states occur for the input from AND gate output 124:

| Transitions on Output 124 | Output on 121 | Output on 122 |
|---|---|---|
| 1st | 0 | 0 |
| 2nd | 1 | 0 |
| 3rd | 0 | 1 |
| 4th | 1 | 1 |
| 5th (1st) | 0 | 0 |

The outputs on lines 121 and 122 are in turn used to control the selection of the bank of four tip and ring lines entering the four to one analog multiplexer 126 so that inbound trunks 1 and 5 are simultaneously tested for a "D" tone when outputs 121 and 122 are both in a zero state, that inbound trunks 2 and 6 are simultaneously tested for a "D" tone if the outputs of 121 and 122 are in a one, zero state that inbound trunks 3 and 7 are tested for a "D" tones if outputs 121 and 122 are in a zero, one state, and that inbound trunks 4 and 8 are tested for a "D" tone if outputs 121 and 122 are in a one, one state. Since the flip flops 118 cause this continuous sequence of states for outputs 121 and 122, the inbound trunks 1 through 8 are repetitively, sequentially tested for a "D" tone by means of this timing circuitry Due to the frequency on output 115, this sequential testing of the inbound trunks takes place for a period of 55 milliseconds per trunk so that after four, 55 milliseconds periods (i.e., 220 milliseconds), each trunk is again tested for the presence of a "D" tone. In this way, the DTMF receivers 104 and 105 simultaneously test for "D" tone on two inbound trunks at the same time, with this testing procedure occurring for 55 milliseconds per trunk and with each trunk being repetitively tested every 220 milliseconds.

Concurrent with the procedure for sequencing the analog multiplexer, outputs 121 and 122 are also decoded by the two to four decoders 102 and 103 so as to allow XN, where XN is X1 to X4 for decoder 102 and X5 to X8 for decoder 103, to go into a logic low state if that decoder is in an enabled state via receipt of enabling signal on input line 127 or 128, respectively.

The enabling of two to four decoders 102 and 103 depends upon the detection of a valid "D" tone by DTMF receiver 104 or 105, respectively.

The DTMF receivers 104 and 105 each receive and decode DTMF signals into a plurality of binary coded signals on outputs 107, 109, 111 and 117, representing each possible DTMF signal as set forht in Table 2 below:

TABLE 2

| $D_3$ (117) | $D_2$ (111) | $D_1$ (109) | $D_0$ (107) | DTMF Tone Received |
|---|---|---|---|---|
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |

TABLE 2-continued

| $D_3$ (117) | $D_2$ (111) | $D_1$ (109) | $D_0$ (107) | DTMF Tone Received |
|---|---|---|---|---|
| 1 | 0 | 0 | 1 | 9 |
| 1 | 0 | 1 | 0 | 0 |
| 1 | 0 | 1 | 1 | * |
| 1 | 1 | 0 | 0 | # |
| 1 | 1 | 0 | 1 | A |
| 1 | 1 | 1 | 0 | B |
| 1 | 1 | 1 | 1 | C |
| 0 | 0 | 0 | 0 | D |

These binary coded signals are connected to logic level decoders 138 and 140 for receivers 104 and 105 respectively so as to generate a logic level output, $\overline{\text{DTONE}}$, on output 139 and 141 respectively, indicative of a binary decoded "D" DTMF signal from the corresponding receiver. Since each receiver is multiplexed to four inbound trunks, each sequential $\overline{\text{DTONE}}$ logic level signals an output 139 and 141 corresponding to one of the inbound trunks.

Worst case valid detection of any DTMF tone requires a maximum of 40 milliseconds by the respective DTMF receiver. Consequently, a 55 millisecond sampling window allows for a safe margin when testing for such a "D" tone by either receiver. The length of the "D" tone generated by the external tone control and measurement system 30, such as Network Control Corporation's STG-16 TM tone responder, is typically 300 milliseconds. Consequently, if only a portion of the "D" tone occurs during the first 55 millisecond sampling window for a particular inbound trunk, after 3 more sampling periods (that is, 3×55 milliseconds, or 165 milliseconds) the "D" tone will again be presented to the DTMF receiver; thereby ensuring that at least two sampling windows per 300 millicycle duration of the "D" tone occur for each and every inbound trunk.

Figure 6:
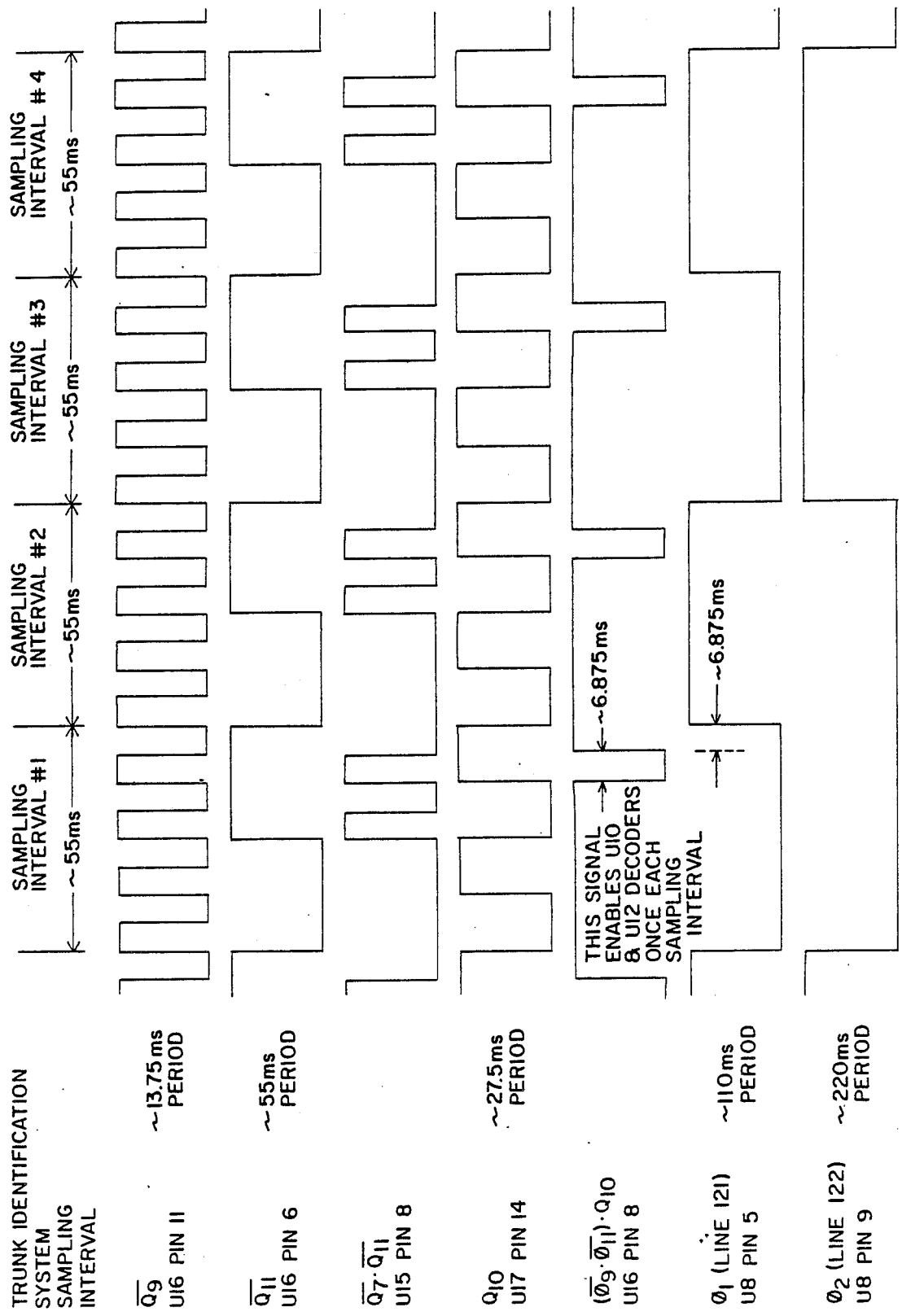
FIG. 6 is a series of waveforms illustrating the manner in which sampling of the DTMF "D" tone detectors occurs so as to avoid possible transient pulse detection associated with sampling during logic transitions.

Logic gates 130, 131, 132, 133, 134, 135 and 120 act on clock signals from decoder 112 to ensure that decoders 138 and 140, which transfer the logic level results on output lines 139 and 141 respectively from respective DTMF receivers 104 and 105 for ultimate presentation to the detection latches 40 (see FIG. 4A), do not make such presentations of the received information concerning the detected "D" tones from the respective inbound trunks during the rising or falling clock edges of outputs 121 and 122. In this manner, potentially false interpretation of a non-existent "D" tone is avoided FIG. 6 shows a series of waveforms with regard to these logic gates, illustrating that sampling by decoders 102 and 103 of $\overline{\text{DTONE}}$ logic level signals from outputs 139 and 141 respectively only occurs for a 6.875 millisecond time period, wherein this time period ends 6.875 milliseconds before the 55 millisecond clock transitions associated with the sampling windows.

In addition, when detection of a "D" tone occurs on any of the inbound trunks 1-8, the respective logic level output 139 or 141 of decoder 138 or 140 goes to a logic low state, thereby gating gate 134, putting its output 144 in the logic low state thereby preventing any further operation of the ring counter outputs on 121 and 122 until the detected "D" tone on either output 139 or 141 ceases to be detected. This result is accomplished by the fact that output 144 when in the low state prevents clock input 115 from causing transitions at output 124 of AND gate 120. This result in turn prevents flip flop 118 from changing state thereby ensuring that the analog multiplexer 126 keeps the selected inbound trunk coupled to the DTMF receiver.

Furthermore, the low state on output 144 is transferred to gate 135 so that its output 146 holds the enable signal to both decoders 138 and 140.

Concurrent with these activities, the $\overline{\text{DTONE}}$ logic level generated on output 139 or 141 (if such a "D" tone is detected) enables the respective decoder 102 or 103 to cause the respective Xn output to go into the low state upon receipt of the proper signal from outputs 121 and 122.

Thus, the outputs X1, X2, X3, X4, X5, X6, X7 and X8 representing the presence or absence of a "D" tone for a particular inbound trunk is strobed into latch 40 (see FIG. 4A) so as to initiate the calculation and transmission of the respective in bound trunk identification number to the near end test control system 32 (see FIG. 1) upon "D" tone detection for the corresponding inbound trunk. Concurrently with the detection of such a "D" tone, a "busy out" relay corresponding to the inbound trunk can be enabled through a signal on the respective relay outputs Z1 through Z8 if a z "busy out" determination is required due to the hunt routine used by the telephone company central office.

The components shown in FIGS. 3, 4 and 5 are generically identified with the exception of those components identified in Table 3.

TABLE 3

| Part Identification Number | FIG. | Manufacturer |
| --- | --- | --- |
| 104, 105 | 3A | Teletone Corp.<br>120th Ave. N.E.<br>Kirkland, WA 98033-0657<br>P.N. M957 |
| 126 | 3A | Analog Devices, Norwood, MA<br>P.N. AD7502KN |
| 86 | 4A | Microtran Company, Inc.<br>145 E. Mineola Avenue<br>Valley Street, NY 11582<br>P.N. T2108 |
| 44 | 4C | Analog Devices<br>P.N. AD7501AN |
| 84, part U28 | 5G | Mostek Corp., Carrollton, TX<br>P.N. 5089 |
| U18, U19 | 5H | 2k × 8 static random<br>access memory (RAM) chips |

Thus what has been described is a trunk identification system which employs the use of digital DTMF receivers and decoders for sequentially and repetitively scanning a plurality of inbound trunks for the presence of a unique DTMF tone ("D" tone) which is indicative of the completion of a test routine on that inbound trunk. By multiplexing the DTMF receiver and decoder with a plurality of inbound trunks, a substantial reduction in electronic circuit components is realized while maintaining extremely accurate detection of the unique DTMF tone without false detection of same due to voice grade use of the inbound trunk. The digital DTMF receivers and decoders thereby eliminate the drift and resultant misdetection of DTMF tones if analog, phase lock loop circuitry is employed.

The present invention further uses logic gating circuitry to ensure that the signals representative of a DTMF detected tone by the DTMF receivers and decoders is accurately strobed into the associated DTMF latch (for use by the remaining portions of the trunk identification system), thereby avoiding the possibility of false information being presented to the latch if such information were presented near logic transition states.

Furthermore, the present invention can, if a top-down rotary hunt sequence is used by the telephone company to determine the next inbound trunk selected, "busy out" each tested inbound trunk during an overall testing program so as to prevent an inbound trunk, once tested, from being retested during the overall test program.

The overall trunk identification system thereby provides a reliable method for INWATS and other direct inward dialed (DID) trunks to be tested by the subscriber through use of an associated near end test control systems and a far end tone control and measurement system. In this manner, the subscriber can complete the testing of all of its leased trunks, even those which are direct inward dialed and therefore not selectable by the calling test system.

It is therefore seen that the objects set forth above and those made apparent from the preceding description are efficiently attained and, since certain changes may be made in the above construction without departing from the scope of the invention, it is intended that all matters contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. A trunk identification system for identifying each of a plurality of inbound trunks upon receipt of a unique signal associated with an interconnected telephone line test system indicative of the completion of a test routine, comprising:

(A) means coupled to the inbound trunks for mulitplexing at least a subset of the plurality of inbound trunks, said multiplexing means sequentially sampling each inbound trunk of said subset of trunks, for a first predetermined length of time so that each inbound trunk of said subset of turnks is sampled during a second, longer, predetermined length of time;

(B) means connected to said multiplexing means for receiving and digitally decoding signals on each inbound trunk of said subset of inbound trunks when the trunks are in an off-hook state, so as to generate a binary coded output signal indicative of each received signal;

(C) means coupled to the receiving and decoding means for detecting when a binary coded output signal represents the receipt of said unique signal from one of the inbound trunks of said subset of inbound trunks, so as to generate a signal indicative of said detection;

(D) means for generating identifying information for said one of the inbound trunks on which the unique signal was detected; and (E) means coupled to the inbound trunk identifying information means and the unique signal detecting means for transmitting an identifying signal representative of the identifying information onto the inbound trunk associated with said unique signal, said identifying signal for receipt by the interconnected telephone line test system.

2. A trunk identification system as defined in claim 1, further comprising gating circuitry connected to the decoded signal generating means for ensuring that each deocded signal is gated for causing the generation of an identifying signal only during non-transition logic state periods so as to avoid possible false detection of the unique signal.

3. A trunk identification system as defined in claim 2 wherein the unique signal is a dual-tone, multi-frequency (DTMP) tone not normally generated by voice grade communications and wherein the receiving and digitally decoding means are a DTMF receiver and decoder and wherein the detecting means receive the outputs of the DTMF receiver and decoder so as to generate a signal only when a unique DTMF signal has been received by the DTMF receiver and decoder.

4. A trunk identification system as defined in claim 3 wherein the multiplexing means comprises an analog multiplexer switch for sequentially and repetitively connecting each inbound trunks of said subset of inbound trunks to the DTMF receiver and decoder and wherein the first predetermined length of time that the DTMF receiver and deocder is connected to a signal on the inbound trunk exceeds the length of time required by the DTMF receiver and decoder to decode any DTMF signal and further wherein the number of inbound trunks of said subset of inbound trunks associated with the analog multiplexer switch is such that the DTMF receiver and decoder is able to detect the DTMF signal regardless of the when the DTMF signal is generated by the interconnected telephone line test system.

5. A trunk identification system for identifying each of a plurality of inbound trunks upon receipt of a unique signal associated with an interconnected telephone line test system indicative of the completion of a test routine, comprising:

(A) means coupled to the inbound trunks for multiplexing at least a subset of the plurality of inbound trunks, said multiplexing means sequentially sampling each inbound trunk of said subset of trunks for a first predetermined length of time so that each inbound trunk of said subset of trunks is sampled during a second, longer, predetermined length of time;

(B) means conencted to said multiplexing means for receiving and digitally decoding signals on each inbound trunk of said subset of inbound trunks when the trunks are in an off-hook state, so as to generate a binary coded output signal indicative of each received signal;

(C) means coupled to the receiving and decoding means for detecting when a binary coded output signal represents the receipt of said unique signal from one of the inbound trunks of said subset of inbound trunks, so as to generate a signal indicative of said detection;

(D) means for generating identifying information for said one of the inbound trunks on which the unique signal was detected;

(E) means coupled to the inbound trunk identifying information means and the unique signal detecting means for transmitting an identifying signal representative of the identifying information onto the inbound trunk associated with said unique signal, said identifying signal for receipt by the interconnected telephone line test system; and (F) means, activatable by the user and coupled to the inbound trunks for maintaining each trunk on which a unique signal has been detected in an off-hook state until all trunks of said subset of trunks have generated a similar unique signal and for placing each such trunk in an on-hook state when all trunks of said subset of trunks have generated such a unique signal.

6. A trunk identification system as defined in claim 5, further wherein said means for maintaining trunks in an off-hook state also places said trunks in an on-hook state if a third predetermined time period is exceeded since the first such trunk has been maintained in an off-hook state.

7. A trunk identification system as defined in claim 6, further comprising gating circuitry connected to the decoded signal generating means for ensuring that each decoded signal is gated for causing the generation of an identifying signal only during non-transition logic state periods so as to avoid possible false detection of the unique signal.

8. A trunk identification system as defined in claim 7, wherein the unique signal is a dual-tone, multi-frequency (DTMF) tone not normally generated by voice grade communications and wherein the receiving and digitally decoding means are a DTMF receiver and decoder and wherein the detecting means receive the outputs of the DTMF receiver and decoder so as to generate a signal only when a unique DTMF signal has been received by the DTMF receiver and decoder.

9. A trunk identification system as defined in claim 8, wherein the multiplexing means comprises an analog multiplexer switch for sequentially and repetitively connecting each inbound trunks of said subset of inbound trunks to the DTMF receiver and decoder and wherein the first predetermined length of time that the DTMF receiver and decoder is connected to a signal on the inbound trunk exceeds the length of time required by the DTMF receiver and decoder to decode any DTMF signal and further wherein the number of inbound trunks of said subset of inbound trunks associated with the analog multiplexer switch is such that the DTMF receiver and decoder is able to detect the DTMF signal regardless of when the DTMF signal is generated by the interconnected telephone line test system.

10. A trunk identification system as defined in claim 5, further comprising gating circuitry connected to the decoded signal generating means for ensuring that each decoded signal is gated for causing the generation of an identifying signal only during non-transition logic state periods so as to avoid possible false detection of the unique signal.

11. A trunk identification system as defined in claim 10, wherein the unique signal is a dual-tone, multi-frequency (DTMF) tone not normally generated by voice grade communications and wherein the receiving and digitally decoding means are a DTMF receiver and decoder and wherein the detecting means receive the outputs of the DTMF receiver and decoder so as to generate a signal only when a unique DTMF signal has been received by the DTMF receiver and decoder.

12. A trunk identification system as defined in claim 11, wherein the multiplexing means comprises an analog multiplexer switch for sequentially and repetitively connecting each inbound trunks of said subset of inbound trunks to the DTMF receiver and decoder and wherein the first predetermined length of time that the DTMF receiver and decoder is connected to a signal on the inbound trunk exceeds the length of time required by the DTMF receiver and decoder to decode any DTMF signal and further wherein the number of inbound trunks of said subset of inbound trunks associated with the analog multiplexer switch is such that the DTMF receiver and deocder is able to detect the DTMF signal regardless of when the DTMF signal is generated by the interconnected telephone line test system.

* * * * *